US012696148B2

(12) United States Patent (10) Patent No.: US 12,696,148 B2
Prakash et al. (45) Date of Patent: Jul. 28, 2026

(54) METHOD AND APPARATUS FOR HANDLING NETWORK FUNCTIONALITIES OF WIRELESS NETWORK

(71) Applicant: SAMSUNG ELECTRONICS CO., LTD., Suwon-si (KR)

(72) Inventors: Satya Prakash, Bangalore (IN); Anoop P V, Bangalore (IN); Nishant, Bangalore (IN); Kailash Kumar Jha, Bangalore (IN); Mohit Kumar, Bangalore (IN); Abhishek Kaswan, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 287 days.

(21) Appl. No.: 18/399,384

(22) Filed: Dec. 28, 2023

(65) Prior Publication Data

US 2024/0224134 A1 Jul. 4, 2024

(30) Foreign Application Priority Data

Dec. 30, 2022 (IN) .............................. 202241077082

(51) Int. Cl.
*H04W 36/00* (2009.01)
*H04W 8/22* (2009.01)
*H04W 36/32* (2009.01)
(52) U.S. Cl.
CPC ......... *H04W 36/0069* (2018.08); *H04W 8/22* (2013.01); *H04W 36/0058* (2018.08); *H04W 36/324* (2023.05)

(58) Field of Classification Search
CPC ............... H04W 8/22; H04W 36/0058; H04W 36/0069; H04W 36/324
See application file for complete search history.

(56) References Cited

U.S. PATENT DOCUMENTS 6,490,452 B1 * 12/2002 Boscovic .......... H04W 36/0009
455/519
8,031,665 B1 * 10/2011 Dinan ................... H04W 28/26
370/329
(Continued)

FOREIGN PATENT DOCUMENTS

CN 115004778 A * 9/2022 .......... H04W 36/037
CN 115004778 B * 6/2024 .......... H04W 36/037
(Continued)

*Primary Examiner* — Eric Nowlin
(74) *Attorney, Agent, or Firm* — NIXON & VANDERHYE P.C.

(57) ABSTRACT

A method for handling network functionalities of a wireless network by a base station. The method may include receiving parameters from a plurality of User Equipments (UEs) in the wireless network. The method may include identifying a plurality of UE clusters within the cell of the base station based on the parameters. The method may include detecting a network service requirement of a UE cluster in the plurality of UE clusters. The method may include determining whether the UE cluster in the plurality of UE clusters meets a threshold condition based on the parameters. The method may include activating a network functionality for the UE cluster based on the network service requirement of the UE cluster upon determining that the UE cluster in the plurality of UE clusters meets the threshold condition.

20 Claims, 20 Drawing Sheets

(56) References Cited

U.S. PATENT DOCUMENTS

| | | | | |
|---|---|---|---|---|
| 8,914,015 | B2 * | 12/2014 | Kim | H04B 7/0417 |
| | | | | 375/144 |
| 9,271,194 | B2 * | 2/2016 | Lu | H04W 36/08 |
| 9,548,770 | B1 * | 1/2017 | Pawar | H04B 7/0617 |
| 10,461,824 | B2 * | 10/2019 | Zhang | H04W 16/28 |
| 10,879,972 | B2 * | 12/2020 | Zhang | H04L 1/06 |
| 11,283,497 | B2 * | 3/2022 | Zhang | H04L 1/1867 |
| 11,349,532 | B1 * | 5/2022 | Marupaduga | H04B 17/345 |
| 12,185,175 | B2 * | 12/2024 | Mwanje | H04W 36/0083 |
| 12,464,419 | B2 * | 11/2025 | Vivanco | H04B 17/27 |
| 2007/0223423 | A1 * | 9/2007 | Kim | H04B 7/0452 |
| | | | | 370/334 |
| 2008/0144536 | A1 * | 6/2008 | Razdan | H04W 84/20 |
| | | | | 455/416 |
| 2013/0223403 | A1 * | 8/2013 | Chen | H04W 36/24 |
| | | | | 370/331 |
| 2013/0324076 | A1 * | 12/2013 | Harrang | H04W 28/0812 |
| | | | | 455/405 |
| 2015/0181481 | A1 | 6/2015 | Masini et al. | |
| 2015/0245255 | A1 * | 8/2015 | Van Phan | H04W 36/0033 |
| | | | | 455/457 |
| 2015/0304902 | A1 | 10/2015 | Yu et al. | |
| 2015/0358860 | A1 * | 12/2015 | Lu | H04W 74/0833 |
| | | | | 370/331 |
| 2016/0065282 | A1 * | 3/2016 | Zhang | H04B 7/0617 |
| | | | | 370/281 |
| 2016/0183147 | A1 * | 6/2016 | Da Silva | H04W 36/22 |
| | | | | 370/331 |
| 2016/0212629 | A1 * | 7/2016 | Wei | H04W 36/0085 |
| 2019/0037449 | A1 * | 1/2019 | Fujishiro | H04W 4/40 |
| 2020/0014437 | A1 * | 1/2020 | Zhang | H04W 16/10 |
| 2020/0044704 | A1 * | 2/2020 | Zhang | H04B 7/0452 |
| 2022/0007256 | A1 * | 1/2022 | Ozturk | H04W 36/0085 |
| 2022/0046486 | A1 * | 2/2022 | Shrestha | H04W 36/0009 |
| 2022/0110039 | A1 * | 4/2022 | Soldati | H04W 28/082 |
| 2022/0217798 | A1 * | 7/2022 | Wang | H04W 76/14 |
| 2022/0240148 | A1 * | 7/2022 | Herczku | H04W 16/12 |
| 2022/0394562 | A1 * | 12/2022 | Wang | H04W 36/0083 |
| 2023/0038861 | A1 * | 2/2023 | Wang | H04W 36/037 |
| 2023/0116853 | A1 * | 4/2023 | Ji | H04W 76/11 |
| | | | | 370/336 |
| 2023/0362746 | A1 * | 11/2023 | Vivanco | H04W 36/324 |
| 2024/0179583 | A1 * | 5/2024 | Rao | G01S 5/0036 |
| 2024/0244499 | A1 * | 7/2024 | Ramachandra | H04W 8/08 |
| 2024/0276430 | A1 * | 8/2024 | Yilmaz | G01S 5/0236 |
| 2024/0292368 | A1 * | 8/2024 | Chen | H04W 48/20 |
| 2024/0334258 | A1 * | 10/2024 | Han | H04W 36/0016 |
| 2024/0389051 | A1 * | 11/2024 | Cogalan | H04W 60/04 |
| 2024/0414772 | A1 * | 12/2024 | Kim | H04W 36/00 |
| 2025/0247908 | A1 * | 7/2025 | Zhang | H04W 56/0015 |
| 2025/0267538 | A1 * | 8/2025 | Parichehrehteroujeni | |
| | | | | H04W 36/32 |
| 2025/0338180 | A1 * | 10/2025 | Imran | H04W 36/00837 |

FOREIGN PATENT DOCUMENTS

| | | | | | |
|---|---|---|---|---|---|
| CN | 118202712 | A | * | 6/2024 | H04W 36/32 |
| CN | 118509907 | A | * | 8/2024 | H04W 36/0061 |
| EP | 4181556 | A1 | * | 5/2023 | H04L 41/16 |
| EP | 4091363 | B1 | * | 6/2024 | H04W 36/037 |
| JP | 2024512642 | A | * | 3/2024 | H04W 64/00 |
| KR | 20250147661 | A | * | 10/2025 | H04W 36/0061 |
| WO | WO-2021154595 | A1 | * | 8/2021 | H04W 36/0061 |
| WO | WO-2022212272 | A1 | * | 10/2022 | G01S 5/0205 |
| WO | WO-2023069001 | A1 | * | 4/2023 | H04W 36/32 |
| WO | WO-2024134661 | A1 | * | 6/2024 | G06N 3/047 |
| WO | WO-2024172523 | A1 | * | 8/2024 | H04W 36/0061 |
| WO | WO-2024186078 | A1 | * | 9/2024 | H04W 24/02 |
| WO | WO-2025075423 | A1 | * | 4/2025 | H04W 24/02 |
| WO | WO-2025239945 | A1 | * | 11/2025 | |

* cited by examiner

INPUT:
- UE#1 INPUT VECTOR p1 WHICH BELONG TO CLUSTER#C
- UE#2 INPUT VECTOR p2 WHICH BELONG TO CLUSTER#C

.....

- UE#N INPUT VECTOR pn WHICH BELONG TO CLUSTER#C
- EVENT#1 THRESHOLD, OFFSET, HYSTERESIS
- EVENT#2 THRESHOLD, OFFSET, HYSTERESIS

.....

- EVENT#E THRESHOLD, OFFSET, HYSTERESIS

407

408

REGRESSION MODEL AT CLUSTER#C

409

- SIMILARITY THRESHOLD
- MOBILITY THRESHOLD
- CONFIG MOBILITY THRESHOLD

406

METHOD AND APPARATUS FOR HANDLING NETWORK FUNCTIONALITIES OF WIRELESS NETWORK

CROSS REFERENCE TO RELATED APPLICATION

This application is based on and claims priority under 35 U.S.C. § 119(a) to Indian Complete patent application number 202241077082, filed on Dec. 30, 2022, in the Indian Patent Office, the disclosure of which is hereby incorporated by reference herein in its entirety.

BACKGROUND

Field

Certain example embodiments relate to an electronic device, and more specifically to a method and/or a base station for handling network functionalities of a wireless network

Description of Related Art

Generally, a User Equipment (UE) performs measurement in an idle mode as well as in a connected mode for cell reselection or handover. In the connected mode, a cellular network provides a measurement configuration to the UE through Radio Resource Control (RRC) signalling. The UE performs the measurement based on the measurement configuration and shares a measurement report to the cellular network for the cell reselection or the handover. As shown in FIG. 1, when the UE is in mobility and an event A3/A5 is configured, then the cellular network evaluates criteria of the event A3/A5. The event A3/A5 criteria meets when a signal strength from a neighbor cell is better than a serving cell by a configured threshold signal strength. The UE sends the measurement report to the cellular network when the criteria is met and then the cellular network moves the UE to the neighbour target cell from the serving cell after evaluating the measurement report.

When a large number of closely spaced UEs are camped in the serving cell with fast degrading channel conditions/cell edge, then the cellular network needs to handle large number of measurement reports being signalled by each UE. The large amount of signalling would lead to high radio resource consumption. Performing measurements and providing radio signalling indication to the cellular network consumes significant power as well as network radio resources at the UEs. Although the UEs are moving to same target cells, these measurements and radio signalling will be performed by each UE. High signalling may lead to limited handling at the cellular network which can delay the decisions like handover or Carrier Aggregation (CA) addition or Secondary Cell Group (SCG) addition, which would lead to failures like Radio Link Failures (RLF), SCG failures, and handover failure. Thus, it is desired to provide a useful alternative for handling network functionalities.

SUMMARY

Certain example embodiments provide a method and/or a base station for handling network functionalities of a wireless network using a Machine Learning (ML) model. Even in fast degrading channel conditions/cell edge, the ML model may allow the base station to quickly take decision on appropriate time to avoid failures like Radio Link Failures (RLF), SCG failures, and/or handover failure, effective utilization of radio resources, and/or reducing power consumption in a UE.

Certain example embodiments reduce measurement report signalling from the UE and hence reduce the failure.

Certain example embodiments partition a cell coverage area using a beam Identifier (ID) and a Timing Advance (TA), forming virtual clusters of the UEs based on the beam ID and the TA and using UE information and the ML model.

Certain example embodiments predict for carrier aggregation configuration or dual connectivity configuration, new radio addition and handover management of the UE clusters using the ML model.

Accordingly, certain example embodiments provide a method for handling network functionalities of a wireless network. The method may include receiving, by a base station of the wireless network, parameters from a plurality of User Equipments (UEs) in the wireless network. The method may include identifying, by the base station, a plurality of UE clusters within a cell of the base station based on the parameters. The method may include detecting, by the base station, a network service requirement of a UE cluster in the plurality of UE clusters. The method may include determining, by the base station, whether the UE cluster in the plurality of UE clusters meets a threshold condition based on the parameters. The method may include activating, by the base station, a network functionality for the UE cluster based on the network service requirement of the UE cluster in case that the UE cluster in the plurality of UE clusters meets the threshold condition.

In an example embodiment, the parameters may include one or more of a previous measurement report from each UE, strength of wireless signal receiving at each UE, capability information of each UE, a location of each UE, a velocity of each UE, a beam identifier (ID) of each UE, and a Timing Advance (TA) of each UE, where the capability information including at least one of a UE category, number of antenna, Radio Access Technology (RAT) capability, band capability, Carrier Aggregation (CA) capability, and Dual Connectivity (DC) capability.

In an example embodiment, the network service requirement may include at least one of a data requirement, a Quality of Service (QoS) requirement, and a call service requirement.

In an example embodiment, the network functionality may comprise at least one of handover, secondary cell addition for a carrier aggregation, second RAT addition for dual connectivity, a RAT Fall Back (RATFB), and reconfiguration of UE measurements.

In an example embodiment, identifying, by the base station, the plurality of UE clusters within the cell of the base station based on the parameters, may include creating, by the base station, the plurality of UE clusters within the cell of the base station based on a beam ID of each UE, and a TA of each UE in the parameters; determining, by the base station, at least one UE sector in each UE cluster based on the beam ID, and the TA; estimating, by the base station, similarity between sectors of multiple UE clusters in the plurality of UE clusters using a similarity function; and/or merging, by the base station, the multiple UE clusters to a single cluster when the similarity between the sectors of the multiple UE clusters is less than a similarity threshold.

In an example embodiment, the method may include removing, by the base station, the sector from the cluster when all UEs in the sector are removed.

In an example embodiment, the method may include removing, by the base station, the cluster when all sectors in the cluster are removed.

In an example embodiment, determining, by the base station, the threshold condition based on the parameters, may include determining, by a trained Machine Learning (ML) model of the base station, whether the parameters belonging to each cluster are within a measurement control information including an offset, a hysteresis, and a threshold; estimating, by the base station, one of: a value of a cost function of the ML model is low when the parameters belonging to each cluster are within the measurement control information, and the value of the cost function of the ML model is high when the parameters belonging to each cluster are not within the measurement control information; determining, by the base station, a similarity threshold, a mobility threshold and a configuration mobility threshold based on the value of the cost function; and determining, by the base station, the threshold condition using at least one of the similarity threshold, the mobility threshold and the configuration mobility threshold.

In an example embodiment, activating, by the base station, the network functionality for the UE cluster based on the network service requirement of the UE cluster upon determining that the UE cluster in the plurality of UE clusters meets the threshold condition, may include determining, by the base station, that one or more UEs in the UE cluster is moving; evaluating, by the base station, a signal strength, a mobility status and a direction of movement of each UE within the UE cluster with respect to an evaluation criteria; and reconfiguring, by the base station, all UEs in the UE cluster meeting the evaluation criteria with a target cell using a Measurement Report (MR) table and a UE velocity for handover.

In an example embodiment, activating, by the base station, the network functionality for the UE cluster based on the network service requirement of the UE cluster upon determining that the UE cluster in the plurality of UE clusters meets the threshold condition, may include evaluating, by the base station, each UE in the UE cluster having higher data transmission requirements and a carrier aggregation support with respect to an evaluation criteria; determining, by the base station, whether information of a sector was entered into a MR table related to a carrier aggregation event, or sectors with higher TA with same beam ID was entered into the MR table related to the carrier aggregation event; and configuring, by the base station, all UEs in the UE cluster meeting the evaluation criteria for secondary cell addition for a carrier aggregation.

In an example embodiment, activating, by the base station, the network functionality for the UE cluster based on the network service requirement of the UE cluster upon determining that the UE cluster in the plurality of UE clusters meets the threshold condition, may include evaluating, by the BS, each UE in the UE cluster having higher data transmission requirements and a dual connectivity support with respect to an evaluation criteria; determining, by the BS, whether the UE cluster with a supported band of each UE was entered in a MR table for connecting to a target RAT; and configuring, by the BS, all UEs in the UE cluster meeting the evaluation criteria for secondary cell group addition for the dual connectivity.

Accordingly, certain example embodiments herein provide the base station for handling the network functionalities of the wireless network. The base station may include a communicator, a memory storing instructions, and at least one processor configured to execute the stored instructions.

The cluster controller may be configured for receiving, through the communicator, the parameters from the plurality of User Equipments (UEs) in the wireless network. The cluster controller may be configured for identifying the plurality of UE clusters within the cell of the base station based on the parameters. The cluster controller may be configured for detecting the network service requirement of the UE cluster in the plurality of UE clusters. The cluster controller may be configured for determining whether the UE cluster in the plurality of UE clusters meets the threshold condition based on the parameters. The cluster controller may be configured for activating the network functionality for the UE cluster based on the network service requirement of the UE cluster in case that the UE cluster in the plurality of UE clusters meets the threshold condition.

Accordingly, certain example embodiments herein provide a non-transitory computer readable storage medium may include one or more programs, the one or more programs comprising instructions configured to, when executed by at least one processor of a base station, cause the base station for handling network functionalities of a wireless network to perform operations comprising receiving parameters from a plurality of user equipments (UEs) in the wireless network. The operations may comprises identifying a plurality of UE clusters within the cell of the base station based on the parameters. The operations may comprises detecting a network service requirement of a UE cluster among the plurality of UE clusters, to determine whether the UE cluster among the plurality of UE clusters meets a threshold condition based on the parameters. And the operations may comprises activating a network functionality for the UE cluster based on the network service requirement of the UE cluster in case that the UE cluster in the plurality of UE clusters meets the threshold condition.

These and other aspects of example embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

BRIEF DESCRIPTION OF FIGURES

Example method and/or apparatus are illustrated in the accompanying drawings, throughout which like reference letters indicate corresponding parts in the various figures. Example embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Figure 1A:
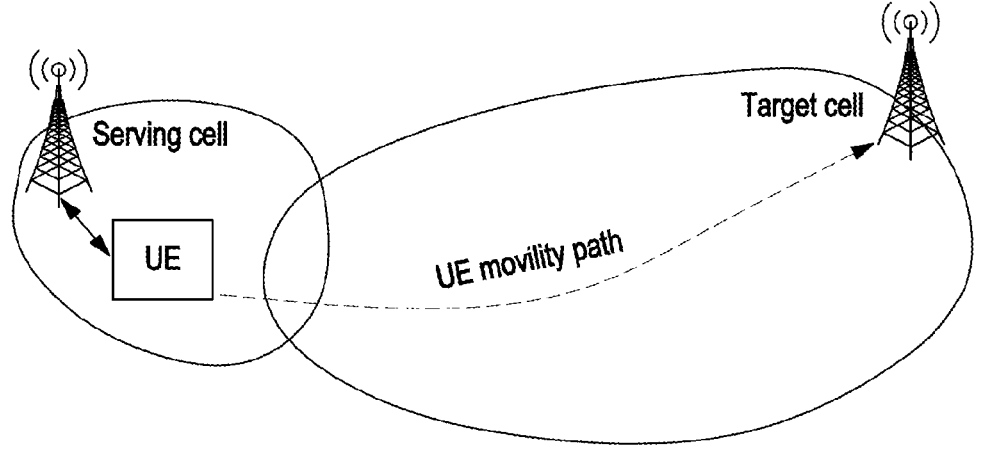
FIG. 1A illustrates mobility of a UE, according to a prior art.
Figure 1B:
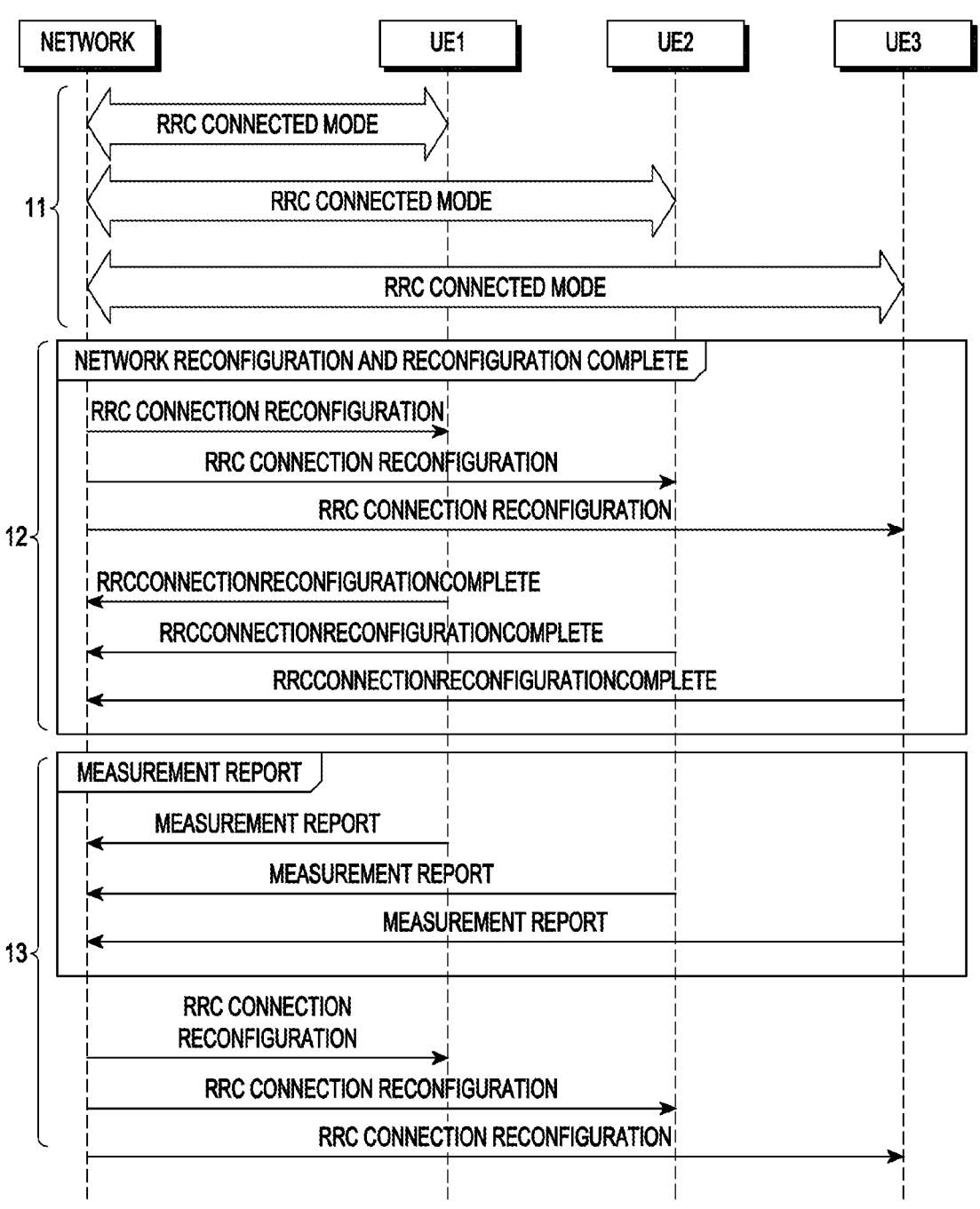
FIG. 1B illustrates signaling between a wireless network and UEs for handover, according to a prior art.

FIG. 1B illustrates signaling between a wireless network (e.g. base station) and UEs (UE1, UE2, UE 3) for handover, according to a prior art. At 11, the UEs are in RRC connected mode. At 12, the wireless network reconfigures the UEs for events measurement and reconfiguration. At 12, each UE performs network configured measurement. As soon as the configured criteria matches, the UE sends the measurement report to the network. At 13, after receiving the measurement report, the wireless network takes the required decision based on measurement report, and conveys to the decision to the UE using reconfiguration message.

Mobility management in high-speed scenario faces the challenges of frequent handovers, high penetration loss, heavy signaling overheads due to group mobility, and fast mobility management procedures such as cell selection. Techniques for solving above issues include mobile relay, deployment optimization with radio remote unit, multi-connection, mobile cell and geo-aided fast handover, etc. 3GPP Release 16 (TS 38.331 v16) had introduced new features such as early measurement reporting, DAPS handover and conditional handover to improve handover performance and robustness. Currently, a configuration of Carrier Aggregation (CA), Dual Connectivity (DC) and Handover (HO) is based upon a measurement report sent by the UE to the wireless network. In a densely populated area, where a number of UEs are camped to the same cell, each of these UEs need to send individual measurement reports to the cell to configure CA, DC and HO. When the number of closely spaced devices camped to the cell is very large particularly in cell edge or fast degrading channel conditions, there can be a high number of explicit measurement report signalling from each UE to the wireless network. Due to this, chances of measurement report transmission failures or radio link failures is quite high. There is a need to smartly manage the handovers in case of large number of closely spaced UEs.

Certain example embodiments propose a smart handling of CA, DC configuration, NR addition and handover management. The wireless network logically partitions the UEs into cluster/s based on the parameters reported by the UEs in an area and using a beam ID, and TA pair. The wireless network randomly chooses a minimum or small set of UEs within the cluster/s that needs to send measurement report through RRC signalling. Only those UEs, for which measurement report is configured, the UEs send the measurement report to the wireless network. The wireless network stores the measurement report along with beam ID and TA. The wireless network takes the CA/DC configuration and the NR addition and handover decision for whole cluster/s, based on the measurement report sent by the chosen UE's.

Accordingly, the embodiments herein provide a method for handling network functionalities of a wireless network. The method includes receiving, by a base station of the wireless network, parameters from a plurality of User Equipments (UEs) in the wireless network. The method includes identifying, by the base station, a plurality of UE clusters within a cell of the base station based on the parameters. The method includes detecting, by the base station, a network service requirement of a UE cluster in the plurality of UE clusters. The method includes determining, by the base station, whether the UE cluster in the plurality of UE clusters meets a threshold condition based on the parameters. The method includes activating, by the base station, a network functionality for the UE cluster based on the network service requirement of the UE cluster upon determining that the UE cluster in the plurality of UE clusters meets the threshold condition.

Accordingly, the embodiments herein provide the base station for handling the network functionalities of the wireless network. The base station includes a cluster controller, a memory, a processor, where the cluster controller is coupled, directly or indirectly, to the memory and the processor. The cluster controller is configured for receiving the parameters from the plurality of User Equipments (UEs) in the wireless network. The cluster controller is configured for identifying the plurality of UE clusters within the cell of the base station based on the parameters. The cluster controller is configured for detecting the network service requirement of the UE cluster in the plurality of UE clusters. The cluster controller is configured for determining whether the UE cluster in the plurality of UE clusters meets the threshold condition based on the parameters. The cluster controller is configured for activating the network functionality for the UE cluster based on the network service requirement of the UE cluster upon determining that the UE cluster in the plurality of UE clusters meets the threshold condition.

Unlike existing methods and systems, the proposed method has high technical value as the overall signalling between the wireless network and the UEs can be significantly minimised or reduced, which fastens an activation of CA/DC and improves handover performance, and success rate, and lowers power consumption in the UEs.

As there is active work ongoing in the wireless industry to integrate artificial intelligence or machine leaning with 5th generation or 6th generation wireless networks, the proposed method provides a smart and unique way of optimizing the CA/DC/handover performance in a region with densely populated UEs, and thereby improve network quality and user experience as well.

Referring now to the drawings, and more particularly to FIGS. 2 through 15B, there are shown preferred embodiments.

Figure 2:
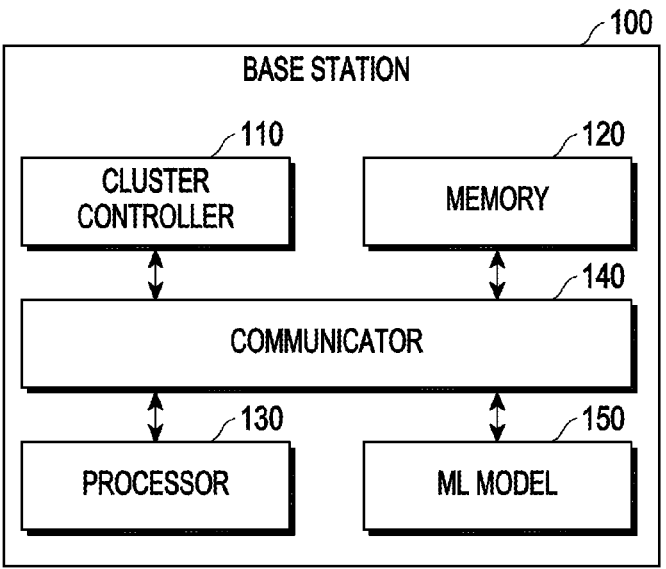
FIG. 2 is a block diagram of a base station for handling network functionalities of the wireless network, according to an example embodiment.

FIG. 2 is a block diagram of a base station (100) for handling network functionalities of a wireless network, according to an example embodiment. Examples of the base station (100) include, but are not limited to a gNodeB, an eNodeB, etc. An example for the wireless network is a cellular network. In an embodiment, the base station (100) includes a cluster controller (110) comprising processing circuitry, a memory (120), a processor (130) comprising processing circuitry, a communicator (140) comprising communication circuitry, and a trained ML model (150), where the ML model (150) may include a physical hardware component that can be used to display to a user. Examples of the main display include, but are not limited to a light emitting diode display, a liquid crystal display, a projector, etc. The cluster controller (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like. At least one processor may include at least one of the processor (130) and the cluster controller (110).

A plurality of User Equipments (UEs) in the wireless network are connected to the base station (100). The cluster controller (110) is configured for receiving the parameters from the plurality of UEs. In an embodiment, where the parameters includes at least one of a previous measurement report from each UE, strength of wireless signal receiving at each UE, capability information of each UE, a location of each UE, a velocity of each UE, a beam identifier (ID) of each UE, and a Timing Advance (TA) of each UE, where the capability information including at least one of a UE category, number of antenna, Radio Access Technology (RAT) capability, band capability, Carrier Aggregation (CA) capability, and Dual Connectivity (DC) capability.

The cluster controller (110) is configured for identifying the plurality of UE clusters within a cell of the base station (100) based on the parameters. The cluster controller (110) is configured for detecting the network service requirement of a UE cluster in the plurality of UE clusters. In an embodiment, where the network service requirement including at least one of a data requirement, a Quality of Service (QoS) requirement, and a call service requirement. The cluster controller (110) is configured for determining whether the UE cluster in the plurality of UE clusters meets the threshold condition based on the parameters. The cluster controller (110) is configured for activating the network functionality for the UE cluster based on the network service requirement of the UE cluster upon determining that the UE cluster in the plurality of UE clusters meets the threshold condition. In an embodiment, where the network functionality is at least one of handover, secondary cell addition for a carrier aggregation, second RAT addition for dual connectivity, a RAT Fall Back (RATFB), and reconfiguration of UE measurements.

In an embodiment, for identifying the plurality of UE clusters within the cell of the base station (100) based on the parameters, the cluster controller (110) is configured for creating the plurality of UE clusters within the cell of the base station (100) based on the beam ID of each UE, and the TA of each UE in the parameters. Further, the cluster controller (110) is configured for determining at least one UE sector in each UE cluster based on the beam ID, and the TA. Further, the cluster controller (110) is configured for estimating similarity between sectors of multiple UE clusters in the plurality of UE clusters using a similarity function. Further, the cluster controller (110) is configured for merging the multiple UE clusters to a single cluster when the similarity between the sectors of the multiple UE clusters is less than a similarity threshold.

In an embodiment, the cluster controller (110) is configured for removing the sector from the cluster when all UEs in the sector are removed.

In an embodiment, the cluster controller (110) is configured for removing the cluster when all sectors in the cluster are removed.

In an embodiment, for determining the threshold condition based on the parameters, the ML model (150) determines whether the parameters belonging to each cluster are within a measurement control information including an offset, a hysteresis, and a threshold. Further, the cluster controller (110) is configured for estimating a value of a cost function of the ML model (150) is low when the parameters belonging to each cluster are within the measurement control information, or the value of the cost function of the ML model (150) is high when the parameters belonging to each cluster are not within the measurement control information. Further, the cluster controller (110) is configured for determining a similarity threshold, a mobility threshold and a configuration mobility threshold based on the value of the cost function using a regression model. Further, the cluster controller (110) is configured for determining the threshold condition using the similarity threshold, and/or the mobility threshold and/or the configuration mobility threshold.

In an embodiment, for activating the network functionality for the UE cluster based on the network service requirement of the UE cluster upon determining that the UE cluster in the plurality of UE clusters meets the threshold condition, the cluster controller (110) is configured for determining that one or more UEs in the UE cluster is moving. Further, the cluster controller (110) is configured for evaluating a signal strength, a mobility status and a direction of movement of each UE within the UE cluster with respect to an evaluation criteria. Further, the cluster controller (110) is configured for reconfiguring all UEs in the UE cluster meeting the evaluation criteria with a target cell using a Measurement Report (MR) table and a UE velocity for handover.

In an embodiment, for activating the network functionality for the UE cluster based on the network service requirement of the UE cluster upon determining that the UE cluster in the plurality of UE clusters meets the threshold condition, the cluster controller (110) is configured for evaluating each UE in the UE cluster having higher data transmission requirements and a carrier aggregation support with respect to an evaluation criteria. Further, the cluster controller (110) is configured for determining whether information of the sector was entered into the MR table related to a carrier aggregation event, or sectors with higher TA with same beam ID was entered into the MR table related to the carrier aggregation event. Further, the cluster controller (110) is configured for configuring all UEs in the UE cluster meeting the evaluation criteria for secondary cell addition for a carrier aggregation.

In an embodiment, for activating the network functionality for the UE cluster based on the network service requirement of the UE cluster upon determining that the UE cluster in the plurality of UE clusters meets the threshold condition, the cluster controller (110) is configured for evaluating each UE in the UE cluster having higher data transmission requirements and a dual connectivity support with respect to an evaluation criteria. Further, the cluster controller (110) is configured for determining whether the UE cluster with a supported band of each UE was entered in a MR table for connecting to a targeted RAT. Further, the cluster controller (110) is configured for configuring all UEs in the UE cluster meeting the evaluation criteria for secondary cell group addition for the dual connectivity.

The memory (120) stores the beam ID, the TA, an ID of the cluster, an ID of the sector, UEs included in the sector/cluster, and the parameters. The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the base station (100), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the base station (100). Further, the communicator (140) is configured to facilitate the communication between the base station (100) and other devices via one or more networks (e.g. Radio technology). The communicator (140) includes an electronic circuit specific to a standard that enables wired or wireless communication.

At least one of plurality of modules of the cluster controller (110) may be implemented through the ML model (150). Each "module" herein may comprise circuitry. A function associated with ML model (150) may be performed through the non-volatile/volatile memory (120), and the processor (130). The one or a plurality of processors (130) control the processing of the input data in accordance with a predefined operating rule or the ML model (150) stored in the non-volatile/volatile memory (120). The predefined operating rule or the ML model (150) is provided through training or learning. Here, being provided through learning indicates that, by applying a learning method to a plurality of learning data, the predefined operating rule or the ML model (150) of a desired characteristic is made. The learning may be performed in the base station (100) itself in which the ML model (150) according to an embodiment is performed, and/or may be implemented through a separate server/system. The ML model (150) may include of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. The learning method is a method for training a predetermined target device (for example, a robot) using a plurality of learning data to cause, allow, or control the target device to make a determination or prediction. Examples of the learning method include, but are not limited to, supervised learning, unsupervised learning, semi-supervised learning, or reinforcement learning.

In existing mechanism, individual UE sends the measurement report in signalling message and the network evaluates the reports to take certain decisions such as Handover, Carrier Aggregation (CA) configuration and Dual Connectivity (DC) configuration. Even though the UEs are closely spaced there will not be much difference in the signal level among the UEs. The individual signalling reports from the UEs increase the signalling load which consumes lots of network radio resources. In addition, power is consumed by UEs for performing measurements and transmitting the signalling message. At network, it has to process individual reports and decide the next action accordingly. For example, for handover, network will evaluate the reports from UEs and then move them to target cells. Due to high amount of signalling, there can be delay in handover command which will lead to failure at UE. If MR missed, decision will be delayed resulting in RLF, SCG-fail or hand-over fail.

Unlike the existing mechanism, when the BS (100) performs cluster formation and convergence for the scenarios where large number of UEs are closely spaced, then at each cluster, the BS (100) executes a regression model to estimate different threshold values. Using the determined threshold values, the BS (100) takes the decision such as handover, configuration of measurement control, CA/DC addition of UEs within the clusters. For example, for handover, one of the UEs from a cluster sent the measurement report related to event A3/A5 (Handover) to the BS (100). Further, the BS (100) evaluates the measurement report and provides the handover to all the UEs within the cluster. No explicit measurement report from the UEs in the cluster would be required. The handover decision from the BS (100) proactively reduces the failures. Moreover, the proposed method helps in minimizing or reducing radio resource consumption, power consumption and most importantly avoiding the radio link failures using Artificial intelligence/ machine learning (AI/ML) based decision.

In an embodiment, the base station (100) is a part of the wireless network, and the base station (100) performs the steps for the wireless network.

Although the FIG. 1 shows the hardware components of the base station (100) but it is to be understood that other embodiments are not limited thereon. In other embodiments, the base station (100) may include less or a greater number of components. Further, the labels or names of the components are used only for illustrative purpose and does not limit the scope. One or more components can be combined together to perform same or substantially similar function for handling the network functionalities of the wireless network.

Figure 3:
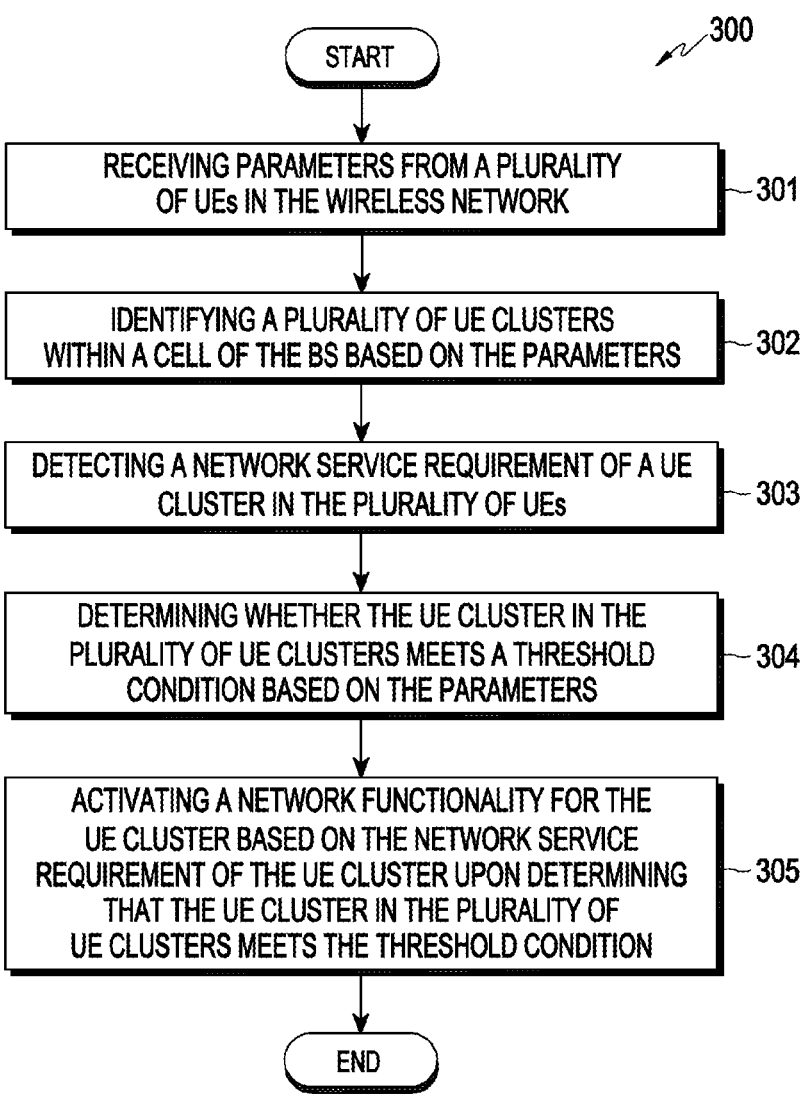
FIG. 3 is a flow diagram illustrating a method for handling the network functionalities of the wireless network, according to an example embodiment.

FIG. 3 is a flow diagram (300) illustrating a method for handling the network functionalities of the wireless network, according to an example embodiment. In an embodiment, the method allows the cluster controller (110) to perform steps 301-305 of the flow diagram (300). At step 301, the method includes receiving the parameters from the plurality of User Equipments (UEs) in the wireless network. At step 302, the method includes identifying the plurality of UE clusters within the cell of the base station (100) based on the parameters. At step 303, the method includes detecting the network service requirement of the UE cluster in the plurality of UE clusters. At step 304, the method includes determining whether the UE cluster in the plurality of UE clusters meets the threshold condition based on the parameters. At step 305, the method includes activating the network functionality for the UE cluster based on the network service requirement of the UE cluster upon determining that the UE cluster in the plurality of UE clusters meets the threshold condition.

The various actions, acts, blocks, steps, or the like in the flow diagram (300) may be performed in the order presented, in a different order, or simultaneously. Further, in some embodiments, some of the actions, acts, blocks, steps, or the like may be omitted, added, modified, skipped, or the like without departing from the scope.

Figure 4A:
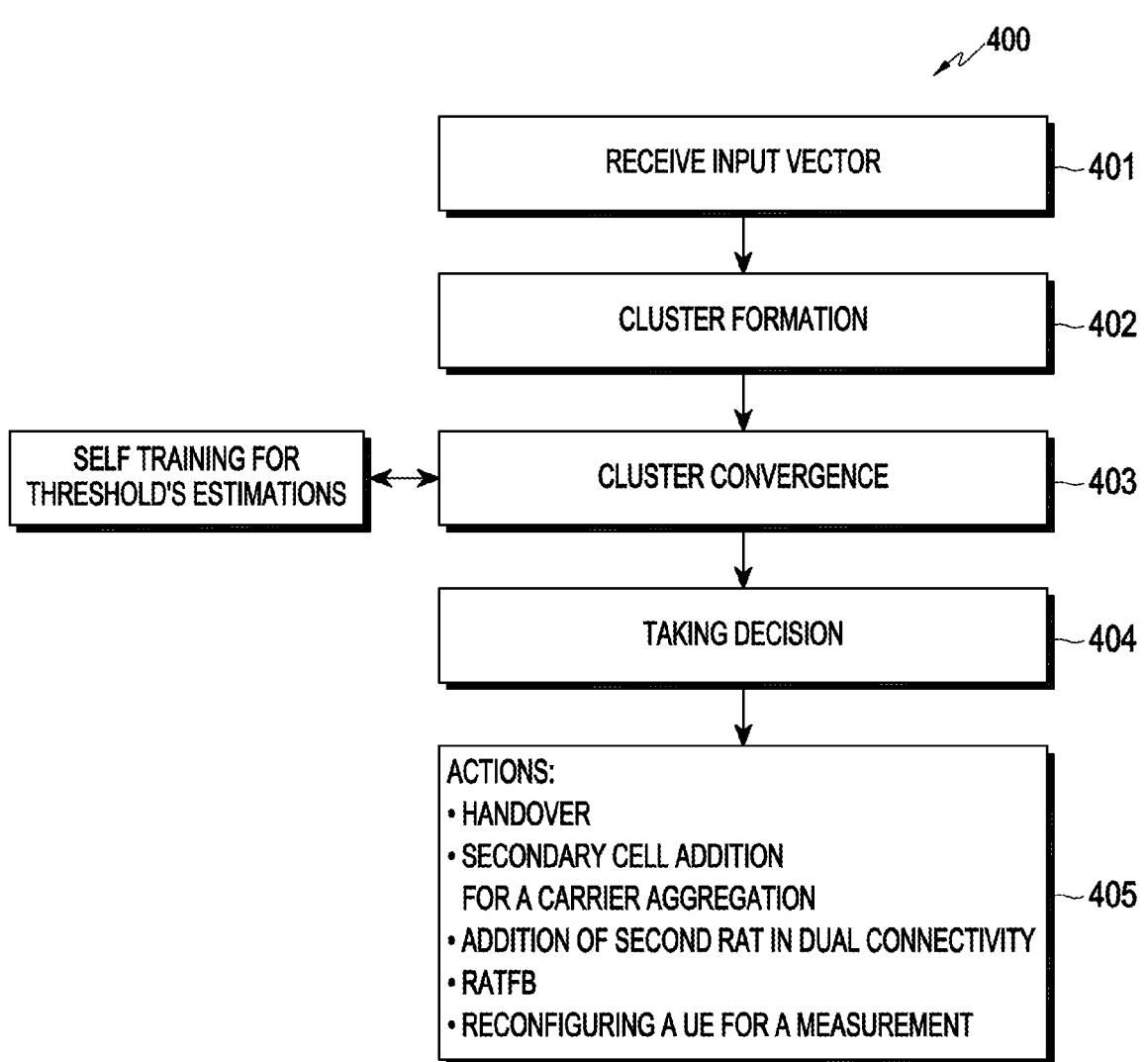
FIG. 4A is a flow diagram illustrating a method of taking decision by the base station, according to an example embodiment.

FIG. 4A is a flow diagram (400) illustrating a method of taking decision by the base station, according to an example embodiment. At 401, the cluster controller (110) receives an input vector (e.g. parameters) includes at least one of the signal strength (e.g. RSRP, RSRQ, RS-SINR), the UE location, the UE velocity, the beam ID, the TA, the UE capability (e.g. band support, CA/DC support capability, protocol features support). The input vectors derived from the UE as well as from the BS (100).

At 402, the cluster controller (110) creates the sets of logical real-time clusters using the ML model (150), where all UEs in one cluster has same beam ID and TA, and each cluster includes one of more UEs. All UEs belonging to one cluster have similar characteristics. This indicates the UEs will me measuring similar signal values, the capabilities of this UEs will almost be similar. The cluster formation allows the BS (100) to take certain the decision like handover or CA/DC addition based on previously reported measurement reports and the UE associated parameters accurately to avoid a RLF or SCG failure. The ML model (150) uses the input vector includes inputs associated with the UE for unsupervised clustering. The ML model (150) uses the UE location and the UE velocity for deciding a future target cell for the UE.

At 403, the cluster controller (110) evaluates the sets of logical real-time cluster using the ML model (150) to perform convergence of the cluster, where the cluster after the convergence may have UEs with more than one beam ID or TA. The cluster convergence is executed for clubbing two sectors with similar characteristics to a single cluster. The cluster convergence is executed to minimize or reduce the number of clusters in a cellular region and to exploit the information associated with the cluster. In a cell, chances are there for some neighbor sectors can have very similar characteristics. So, cluster controller (110) merges these neighbor sectors together to form the single cluster. The cluster convergence is performed for the scenarios where the UE has ended its connection with the cell or moved to another location/cell. e.g. when a new UE is added or an existing UE is removed from the sector then cluster convergence has to be executed based on a similarity function. The cluster controller (110) uses the similarity function to evaluate similarity characteristics between two sectors. The similarity function is a Euclidian distance between two sectors. An equation for determining the similarity function is given below.

$$\text{Similarity } (\text{Sector}_{BeamIDi,TAi}, \text{Sector}_{BeamIDj,TAj}) =$$

$$\left\| m_{BeamID_i,TAi} - m_{BeamID_j,TAj} \right\|^2$$

where $m_{BeamID_i, TAi}$ is mean of input vector of all the UE belonging to sector i. In an embodiment, if the similarity values of the two sectors i and j are less than a similarity threshold then $i^{th}$ and $j^{th}$ sectors become part of a single cluster. e.g. if similarity (Sector$_{BeamID_i, TAi}$, Sector$_{BeamID_j, TAj}$)<similarity threshold, then $i^{th}$ and $j^{th}$ sectors become part of a single cluster, otherwise the $i^{th}$ and $j^{th}$ sectors are part of different clusters.

The ML model (150) (e.g. regression model) self-trains at each cluster to estimate different threshold values. At 404-405, the cluster controller (110) takes the decision to perform actions such as the handover, the secondary cell addition for a carrier aggregation, addition of second RAT in dual connectivity, RATFB, reconfiguring the UE for a measurement based on the determined threshold values. The proposed method helps in minimizing or reducing radio resource wastage, power consumption and most importantly avoiding the radio link failures.

Figure 4B:
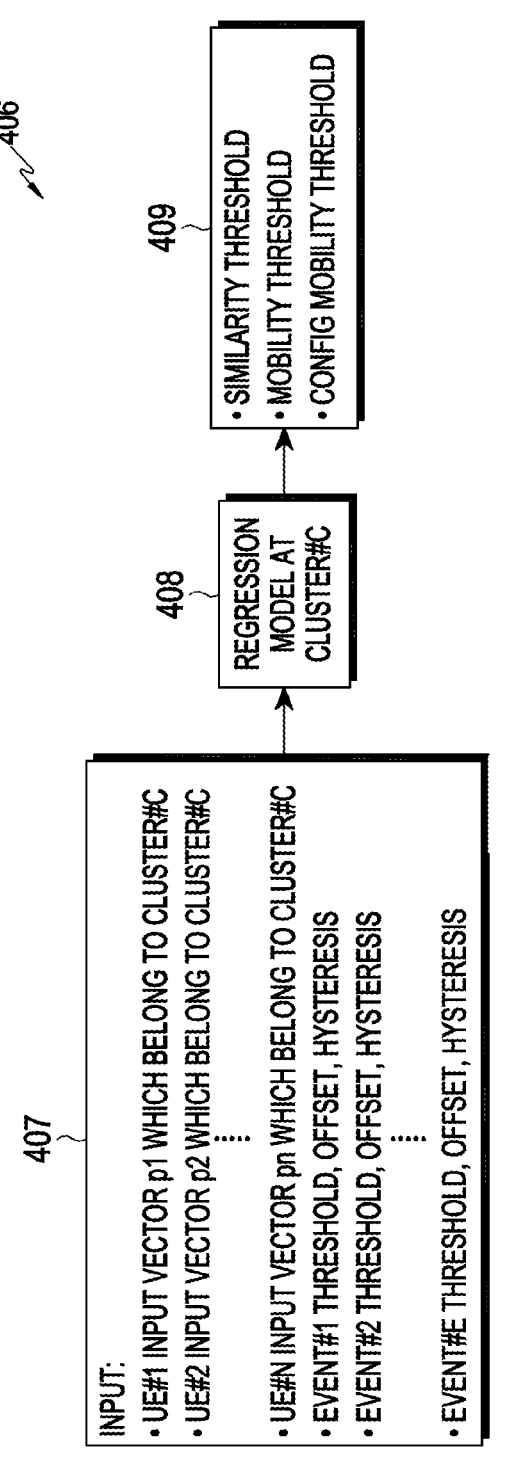
FIG. 4B is a flow diagram illustrating a method for self-training for threshold determination for taking the decision, according to an example embodiment.

FIG. 4B is a flow diagram (406) illustrating a method for self-training for threshold determination for taking the decision, according to an example embodiment. Once cluster formation and cluster convergence are completed, then the BS (100) determines the threshold values to take decision for the clusters like the handover, the CA/DC addition, the RATFB at each clusters. These threshold values are determined using the regression model (408) which is executed at each cluster. At 409, the cluster controller (110) determines the optimal values for the similarity threshold, the mobility threshold and the configuration mobility threshold, where the cluster controller (110) uses the similarity threshold for the cluster convergence, the cluster controller (110) uses the mobility threshold to perform handover for the UEs belonging to the cluster, and the cluster controller (110) uses the configuration mobility threshold to configure the UEs belonging to the cluster based on mobility. The regression model (408) takes all UE's input vector, measurement control information like the offset, hysteresis, and the threshold (407) for determining the cost function. Further, the regression model checks whether all UE's vectors belonging to same cluster are within the offset and threshold limit or not based on the cost function. Further, the regression model determines the threshold values for taking decisions.

Figure 5:
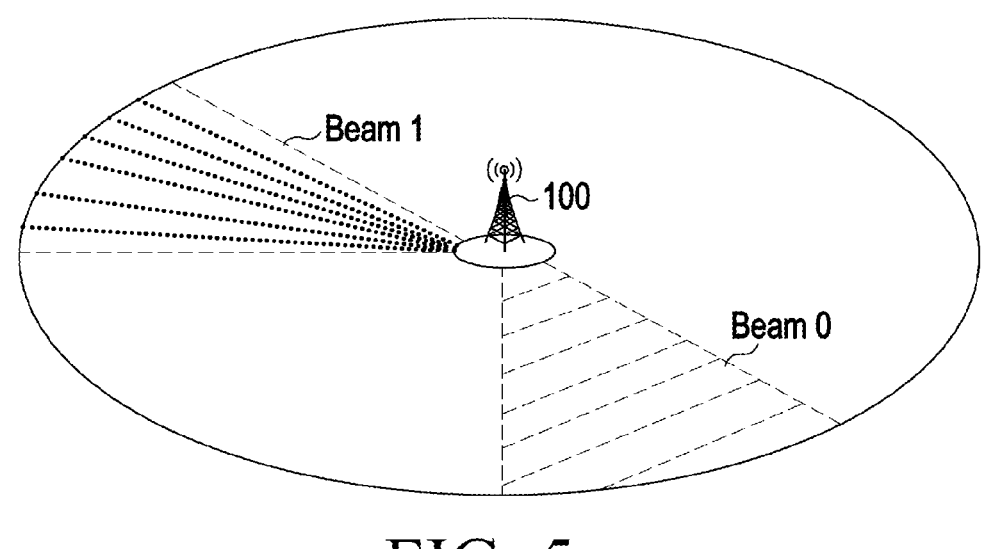
FIG. 5 illustrates few beams of a cell, according to an example embodiment.

FIG. 5 illustrates few beams of a cell, according to an example embodiment. The BS (100) transmits various beams within the cell of the BS (100) within a coverage are of the cell corresponding to the BS (100). Out of this various beams, two beams with beam IDs 1 and 0 are shown in FIG. 5.

Figure 6:
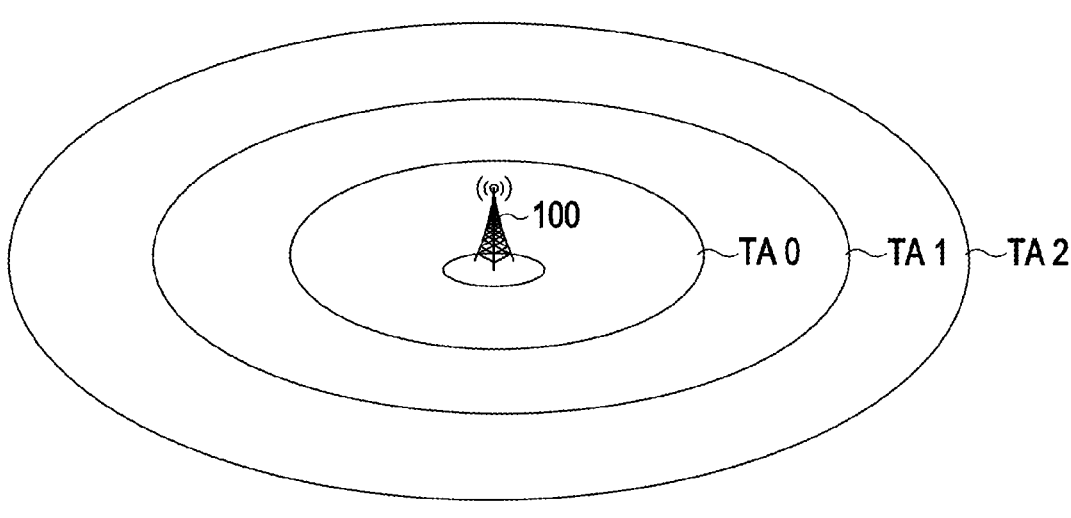
FIG. 6 illustrates few TAs in the cell, according to an example embodiment.

FIG. 6 illustrates few TAs in the cell, according to an example embodiment. The TA is a command sent by the BS (100) to the UE to adjust an uplink transmission of the UE. Further, the UE sends uplink symbols in advance according to the command. TA informs the UE an amount of time that the UE needs to advance the adjust transmissions. TA depend on a signal propagation delay from the BS (100) to the UE e.g. different UEs located at different location have different timing advance. The TA of the UEs present in a nearby region within the cell of the BS (100) within the coverage region of the cell is represented by TA0. The TA of the UEs present a far region within the cell of the BS (100) within the coverage region of the cell is represented by TA2. The TA of the UEs present in between the nearby region and the far region within the cell of the BS (100) within the coverage region of the cell is represented by TA1.

Figure 7A:
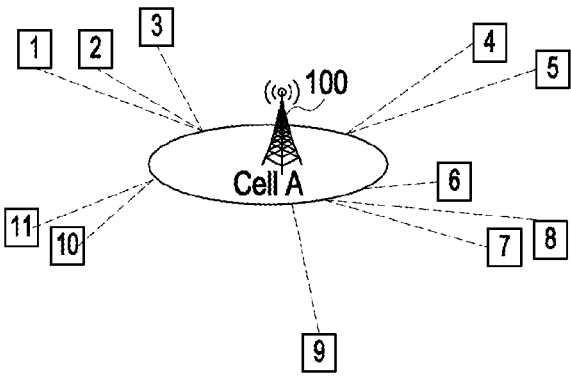
FIGS. 7A-7B illustrate an example scenario of creating clusters of the UEs in a cell, according to an example embodiment.
Figure 7B:
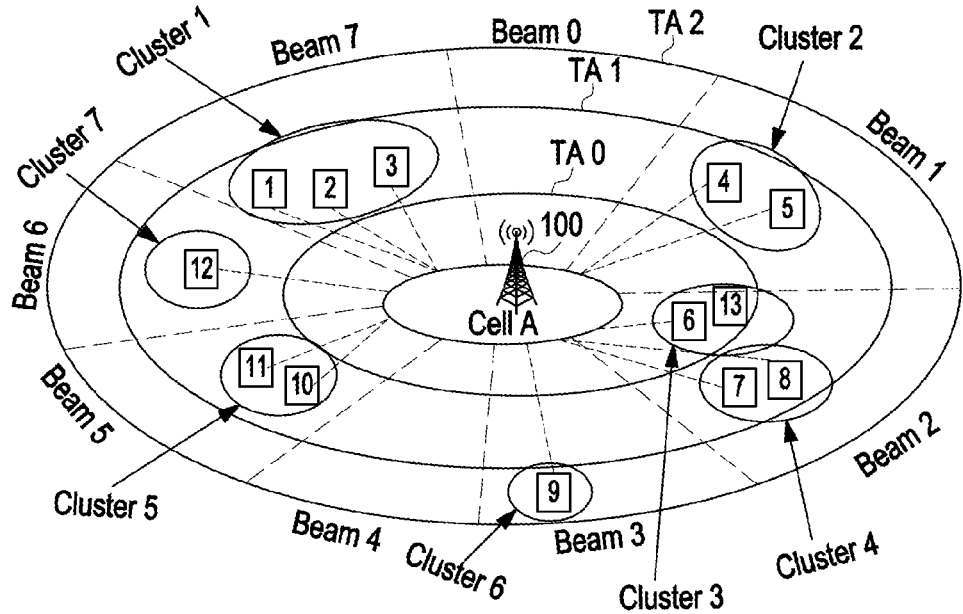

FIGS. 7A-7B illustrate an example scenario of creating clusters of the UEs in a cell, according to an example embodiment. Consider, 12 UEs (UE 1 to UE 12) are connected to the BS (100), where the 12 UEs (UE 1 to UE 12) are located at different regions within the cell of the coverage region of the cell as shown in FIG. 7A. The BS (100) identifies the beam ID and TA of all UEs (UE 1 to UE 12). Consider, 8 beam IDs (e.g. beam 0 to beam 7), and 3 TAs (e.g. TA 0 to TA 2) are available for the BS (100). The UEs (1, 2, 3) has same beam ID and TA (e.g. beam 7, TA 1). So, the BS (100) virtually creates the cluster for the UEs (1, 2, 3) and gives an ID for the cluster, e.g. cluster 1. Similarly, the BS (100) virtually creates the cluster for other UEs that have common beam ID and TA, and gives different cluster IDs. Thus, the BS (100) virtually creates 7 clusters (e.g. cluster 1 to cluster 7) of the UEs as shown in FIG. 7B.

The sectors are represented using the beam ID and the TA in the cellular region. The BS (100) forms the logical clusters using these sectors. When the UE is in RRC connected state, then the UE belongs to one particular sector defined using the beam ID and the TA. When the sector has one or more UEs present, then the BS (100) forms the logical clusters of UEs which are having similar characteristics. The clusters and sectors are represented by assigning an ID to each. The created clusters, the sectors under the clusters, the beam ID and the TA of each sector, and the UEs present in each sector in this example scenario is given in table 1.

TABLE 1

| Cluster ID | Sector ID | Beam ID | TA | UE's ID |
|---|---|---|---|---|
| Cluster 1 | Sector$_{7,1}$ | 7 | 1 | 1, 2, 3 |
| Cluster 2 | Sector$_{1,1}$ | 1 | 1 | 4, 5 |
| Cluster 3 | Sector$_{2,0}$ | 2 | 0 | 6 |
| Cluster 4 | Sector$_{2,1}$ | 2 | 1 | 7, 8 |
| Cluster#5 | Sector$_{5,1}$ | 5 | 1 | 10, 11 |
| Cluster 6 | Sector$_{3,2}$ | 3 | 2 | 9 |
| Cluster 7 | Sector$_{6,1}$ | 6 | 1 | 12 |

Figure 8:
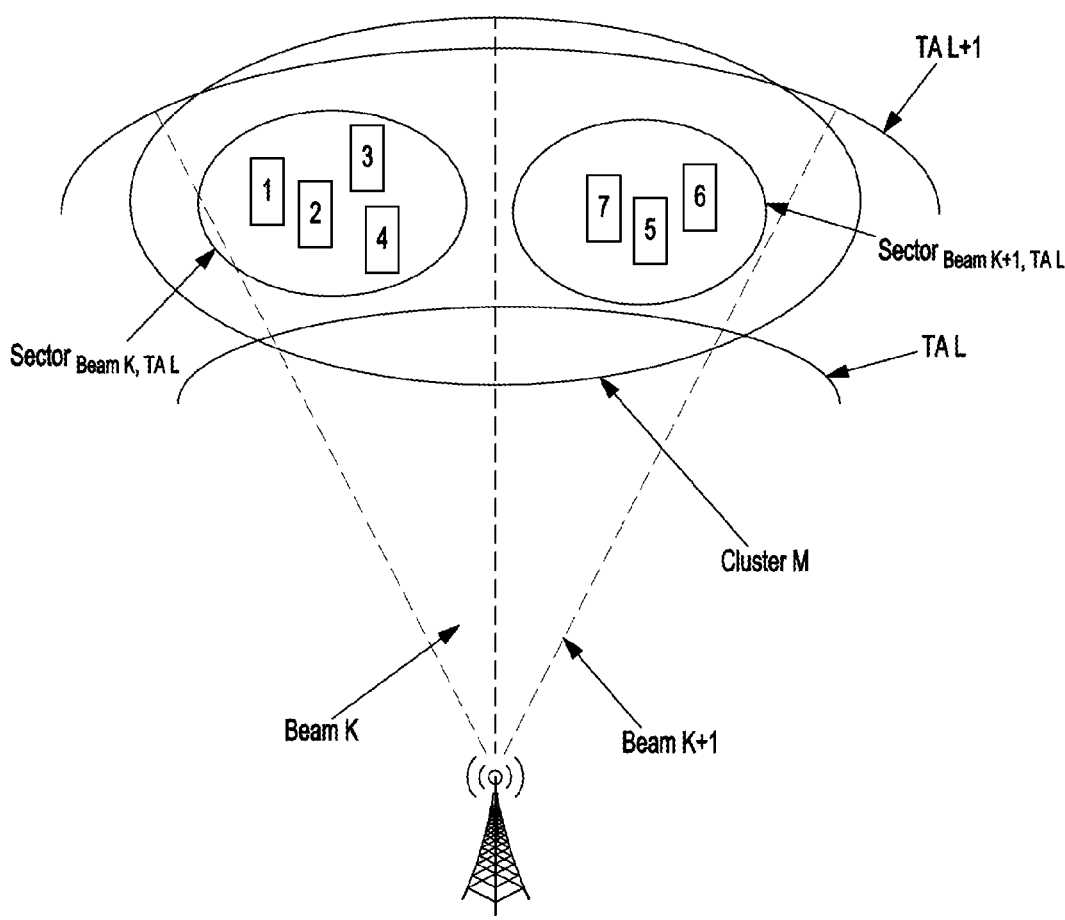
FIG. 8 illustrates an example scenario of representing sectors and the clusters of the UEs in the cell, according to an example embodiment.

FIG. 8 illustrates an example scenario of representing the sectors and the clusters of the UEs in the cell, according to an example embodiment. Consider, the two TAs "TA L" and "TA L+1", and two beams "beam K" and "beam K+1" of the BS (100). UE 1 to UE 4 are located in the region within the cell of the BS (100) with the beams ID "beam K" and TA "TA L". So, the BS (100) logically creates the sector "Sector$_{Beam\ K,\ TA\ L}$" by including the UE 1 to UE 4.

UE 5 to UE 7 are located in the region within the cell of the BS (100) with the beams ID "beam K+1" and TA "TA L". So, the BS (100) logically creates the sector "Sector$_{Beam\ K+1,\ TA\ L}$" by including the UE 5 to UE 7. Further, the BS (100) creates the cluster M by including the two sectors "Sector$_{Beam\ K+1,\ TA\ L}$" and "Sector$_{Beam\ K,\ TAL}$".

Figure 9:
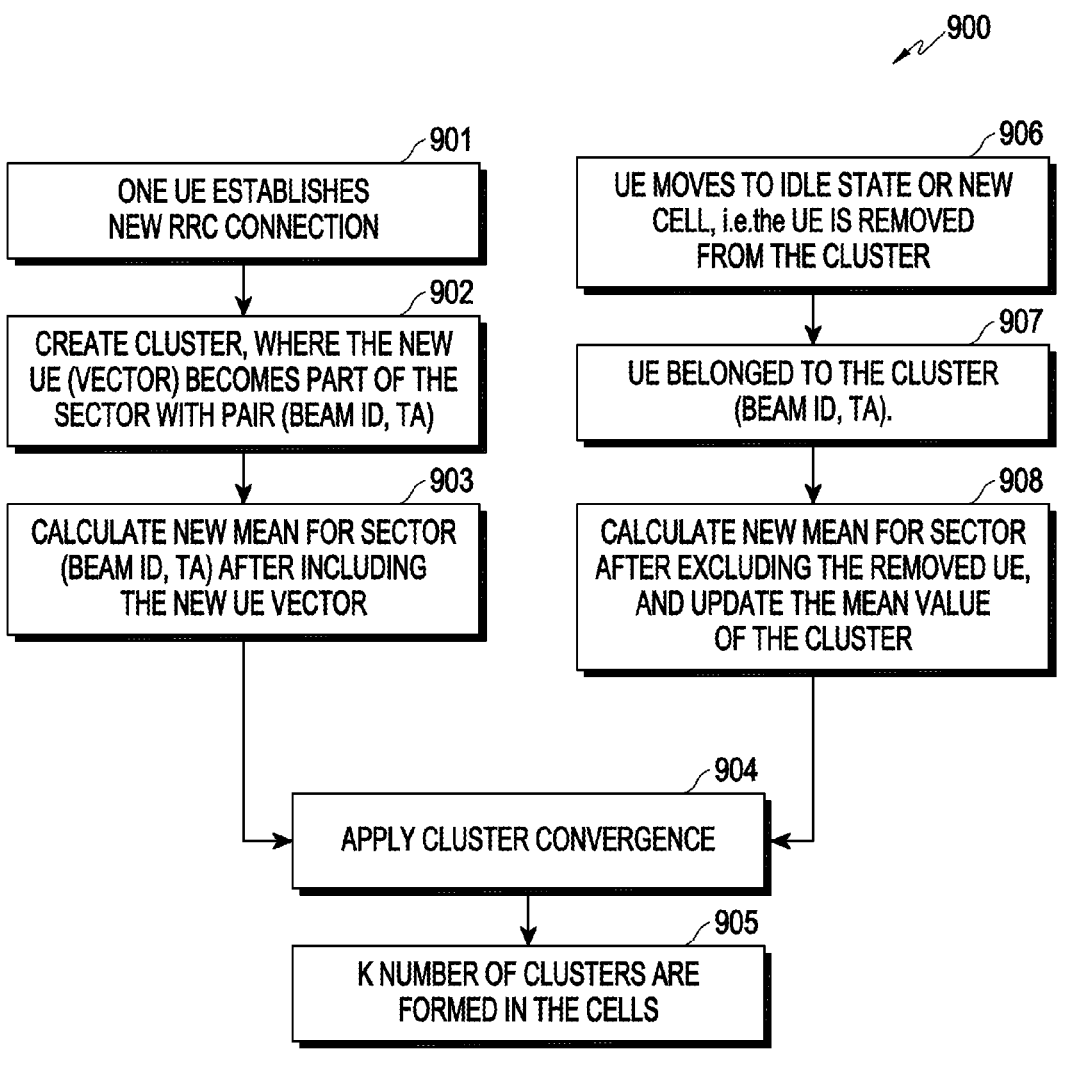
FIG. 9 is a flow diagram illustrating a method for cluster convergence, according to an example embodiment.

FIG. 9 is a flow diagram (900) illustrating a method for cluster convergence, according to an example embodiment. In one scenario, at 901, the UE establishes a new RRC connection with the BS (100). Further at 902, the BS (100) creates the cluster, where the UE that established the new RRC connection becomes part of the sector with a pair (e.g. Beam ID, TA). Further at 903, the BS (100) determines a new mean for the sector after including the new UE. Further at 904-905, the BS (100) applies the cluster convergence and forms K number of clusters in the cell. In another scenario, at 906-907, the UE moves to an idle state or a new cell, e.g. the UE is removed from the cluster, and the UE belongs to the cluster with the beam ID, and TA. Further at 908, the BS (100) determines a new mean for the sector after excluding the removed UE, updates the mean value of the cluster, and continues the steps 904 and 905.

Figure 10A:
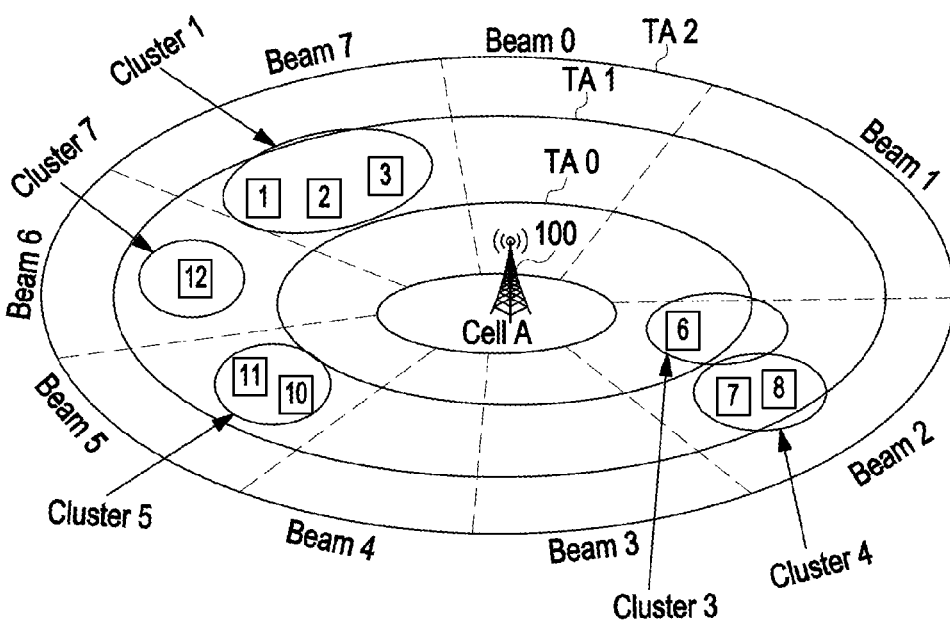
FIGS. 10A-10D illustrate an example scenario of the cluster convergence due to addition of the UE into the cell and deletion of the UE from the cell, according to an example embodiment.

FIGS. 10A-10D illustrate an example scenario of the cluster convergence due to addition of the UE into the cell and deletion of the UE from the cell, according to an example embodiment. Consider, 9 UEs (1, 2, 3, 6, 7, 8, 10, 11, 12) are connected to the BS (100), where the 9 UEs (1, 2, 3, 6, 7, 8, 10, 11, 12) are located at different regions within the cell of the coverage region of the cell as shown in FIG. 10A. The BS (100) identifies the beam ID and TA of all UEs. Consider, 8 beam IDs (e.g. beam 0 to beam 7), and 3 TAs (e.g. TA 0 to TA 2) are available for the BS (100). The UEs (1, 2, 3) has same beam ID and TA (e.g. beam 7, TA 1). So, the BS (100) virtually creates the cluster for the UEs (1, 2, 3) and gives the ID for the cluster, e.g. cluster 1. Similarly, the BS (100) virtually creates the cluster for other UEs that have common beam ID and TA, and gives different cluster IDs. Thus, the BS (100) virtually creates 5 clusters (e.g. cluster 1, cluster 3, cluster 4, cluster 5, cluster 7) of the UEs as shown in FIG. 10A.

The clusters, the sectors under each cluster, the beam ID and the TA of each sector, and the UEs present in each sector in this example scenario is given in table 2.

TABLE 3

| Cluster ID | Sector ID | Beam ID | TA | UE's ID |
|---|---|---|---|---|
| Cluster 1 | Sector$_{7,1}$ | 7 | 1 | 1, 2, 3 |
| Cluster 3 | Sector$_{2,0}$ | 2 | 0 | 6 |
| Cluster 4 | Sector$_{2,1}$ | 2 | 1 | 7, 8 |
| Cluster 5 | Sector$_{5,1}$ | 5 | 1 | 10, 11 |
| Cluster 7 | Sector$_{6,1}$ | 6 | 1 | 12 |

Figure 10B:
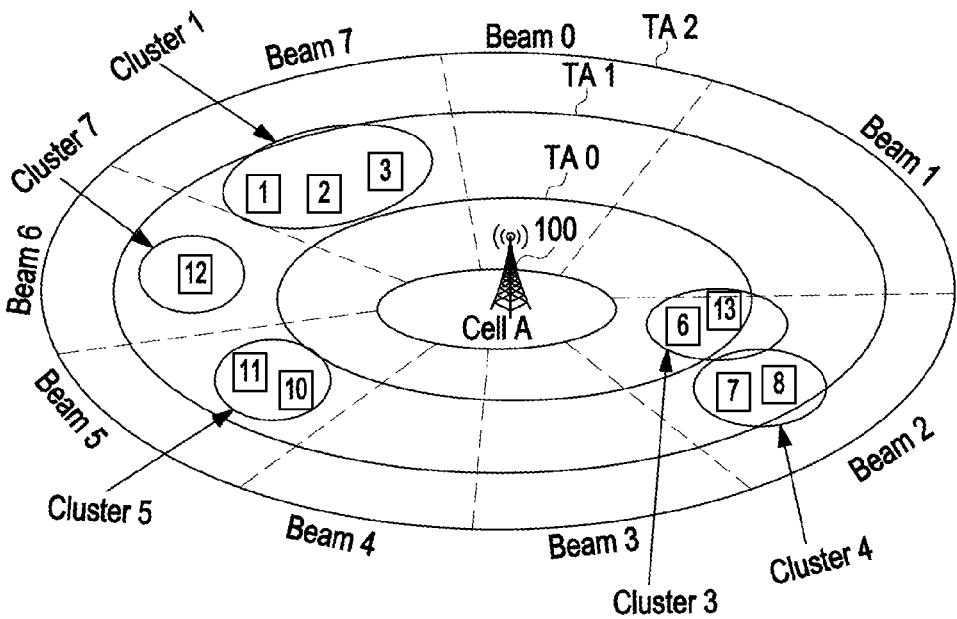
Figure 10C:
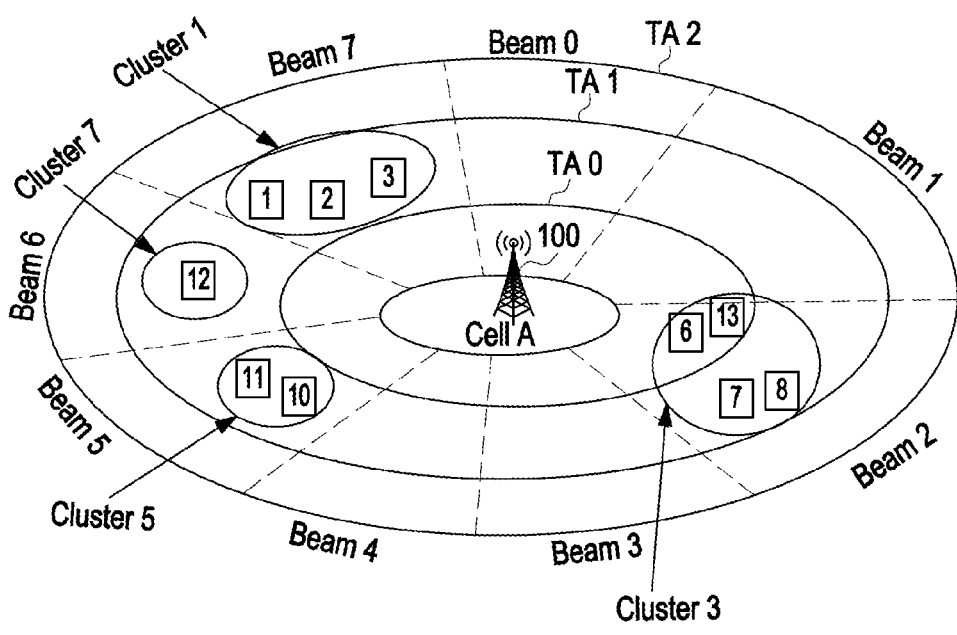

As shown in the FIG. 10B, consider a new connection from a UE 13 is performed in the cell, with the beam is beam 2 and the TA is TA 0. So, the UE 13 is added to the sector$_{2,0}$. The sector$_{2,0}$ already has the UE 6 which are part of the cluster 3 as given in table 4.

TABLE 4

| Cluster ID | Sector ID | Beam ID | TA | UE's ID |
|---|---|---|---|---|
| Cluster 1 | Sector$_{7,1}$ | 7 | 1 | 1, 2, 3 |
| Cluster 3 | Sector$_{2,0}$ | 2 | 0 | 6, 13 |
| Cluster 4 | Sector$_{2,1}$ | 2 | 1 | 7, 8 |
| Cluster 5 | Sector$_{5,1}$ | 5 | 1 | 10, 11 |
| Cluster 7 | Sector$_{6,1}$ | 6 | 1 | 12 |

Now, the UE 13 also becomes part of the cluster 3, and new mean determined for cluster 3 is $m_{2,0}$. The UE 13 is added to the sector$_{2,0}$, which further triggers the cluster convergence in the sector$_{2,0}$. The BS (100) determines the similarity of the neighbour sectors using the similarity function for the convergence. When similarity is less than the similarity threshold for two neighbour sectors, then the BS (100) merges both the sectors. As shown in the FIG. 10B, based on the similarity calculation for the neighbour sectors, the BS (100) merges the sector$_{2,1}$ with the sector$_{2,0}$, and cluster 3 with the cluster 4 as given in table 5.

TABLE 5

| Cluster ID | Sector ID | Beam ID | TA | UE's ID |
|---|---|---|---|---|
| Cluster 1 | Sector$_{7,1}$ | 7 | 1 | 1, 2, 3 |
| Cluster 5 | Sector$_{5,1}$ | 5 | 1 | 10, 11 |
| Cluster 7 | Sector$_{6,1}$ | 6 | 1 | 12 |
| Cluster 3 | Sector$_{2,0}$ | 2 | 0 | 6, 13 |
| | Sector$_{2,1}$ | 2 | 1 | 7, 8 |

Figure 10D:
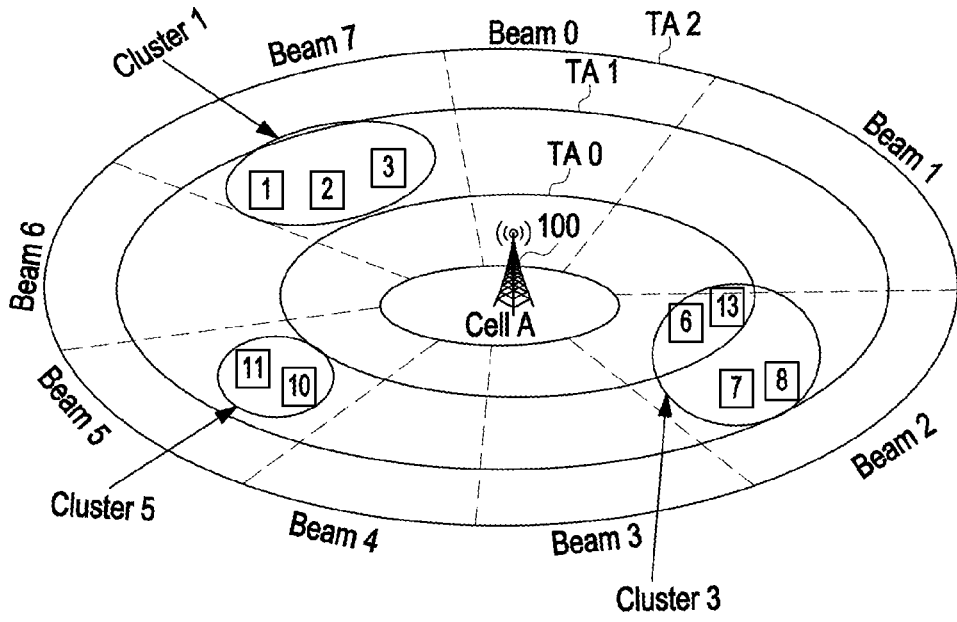

As shown in the FIG. 10D, consider the UE 2 is getting removed from the cell. The UE 12 belongs to beam 6 and TA 1, so the UE 12 is part of sector$_{6,1}$. The BS (100) removes the new mean $m_{6,1}$ for sector$_{6,1}$ after removing the UE 12. Since only one UE was in the sector$_{6,1}$, then $m_{6,1}$ is 0. The sector$_{6,1}$ is part of the cluster 7, so the BS (100) removes the sector$_{6,1}$ from the sector list. After removal of Sector$_{6,1}$, there is no sector present, so cluster 7 is also removed from the cell as given in table 6.

TABLE 6

| Cluster ID | Sector ID | Beam ID | TA | UE's ID |
|---|---|---|---|---|
| Cluster#1 | Sector$_{7,1}$ | 7 | 1 | 1, 2, 3 |
| Cluster#5 | Sector$_{5,1}$ | 5 | 1 | 10, 11 |
| Cluster#3 | Sector$_{2,0}$ | 2 | 0 | 6, 13 |
| | Sector$_{2,1}$ | 2 | 1 | 7, 8 |

Figure 11:
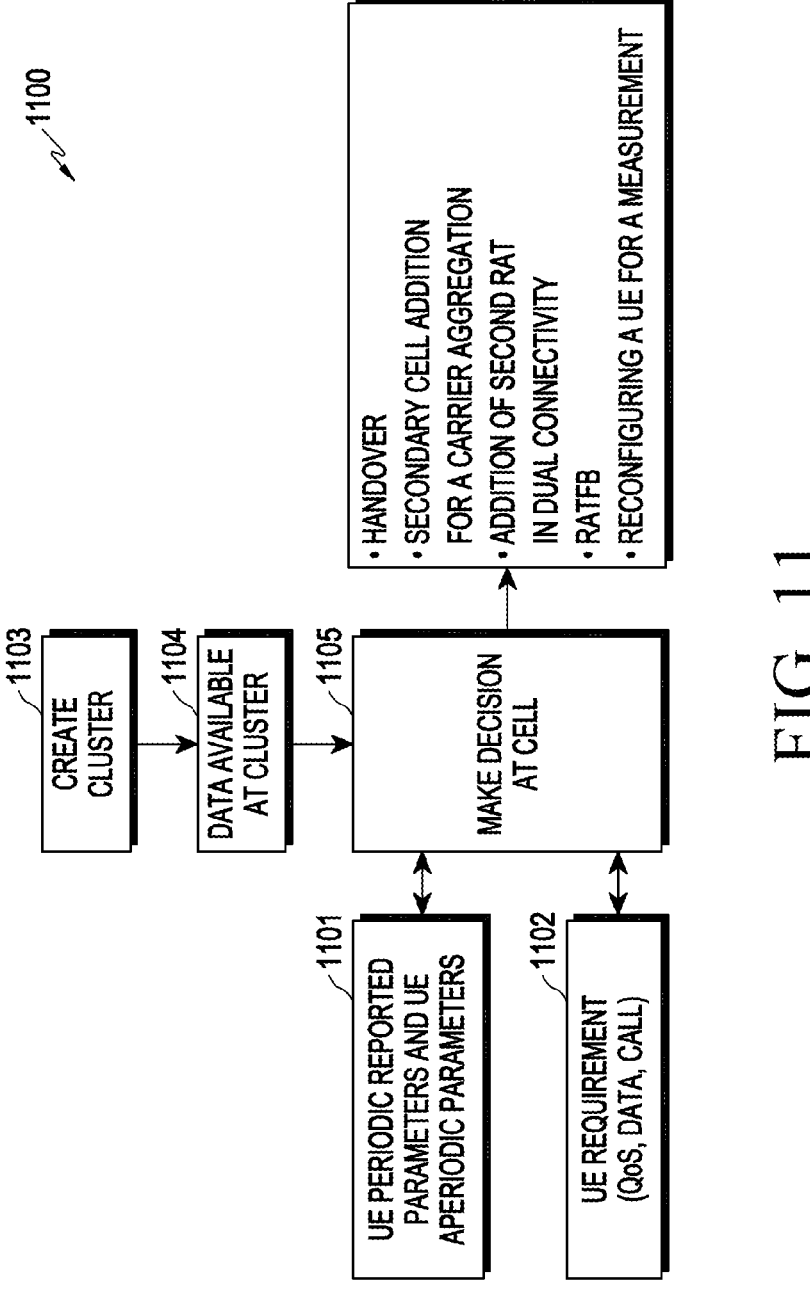
FIG. 11 is a flow diagram illustrating a method for taking the decision, according to an example embodiment.

FIG. 11 is a flow diagram (1100) illustrating a method for taking the decision, according to an example embodiment. Once the clusters (1103) are formed and the thresholds (1104) are determined, then the BS (100) monitors the signal condition (1101) and session requirements (1102) of all the UEs present in the cluster. Further, the BS (100) takes the decisions (1105) for the UEs in the cluster using the determined threshold values using the ML model (150).

Figure 12A:
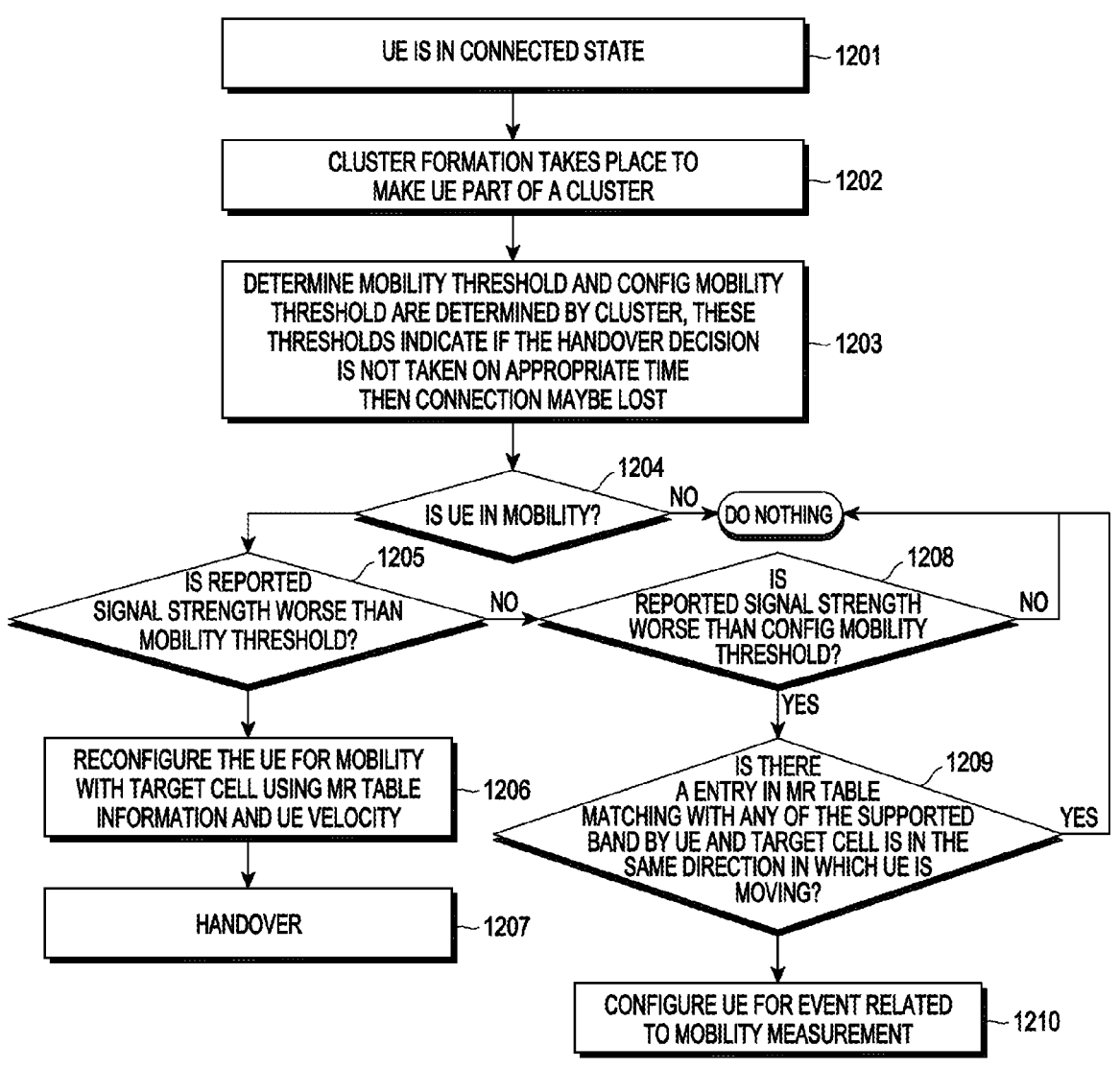
FIG. 12A is a flow diagram illustrating a method for taking decision for handover, according to an example embodiment.

FIG. 12A is a flow diagram (1200) illustrating a method for taking the decision for the handover, according to an example embodiment. At 1201, the UE is in connected state. At 1202, the BS (100) forms the cluster of the UEs and performs the cluster convergence. All the UEs become part of one or the other clusters. The characteristics of the UEs in a cluster will be almost similar. At 1203, the BS (100) determines the mobility threshold and the configuration mobility threshold for the cluster using regression to take decision, where these thresholds indicate if the handover decision is not taken on appropriate time then connection may be lost. The mobility threshold is the signal strength after which the UE might lose the active connection if proper decision is not taken at right time. The configuration mobility threshold is the signal strength at which the UE start searching for better candidate of the target cell. Based on threshold value and the current signal level of the UEs in the clusters, the network evaluates all the UEs in the cluster. At 1204-1205, upon detecting that the UE is in mobility, then the BS (100) checks whether the signal strength reported by the UE is less than the mobility threshold.

At 1206-1207, when the signal strength reported by the UE is less than the mobility threshold, then the BS (100) reconfigures the UE for mobility with target cell using the MR table information and the UE velocity, and sends a handover command to all the UEs in the cluster. At 1208, when the signal strength reported by the UE is not less than the mobility threshold, then the BS (100) checks whether the reported signal strength is less than the configuration mobility threshold. At 1209-1210, when the reported signal strength is less than the configuration mobility threshold, then the BS (100) checks whether an entry is in the MR table matching with any of the supported band by the UE, and the target cell is in the same direction in which the UE is moving. At 1210, when the entry is in the MR table matching with any of the supported band by the UE, and the target cell is in the same direction in which the UE is moving, then the BS (100) configures the UE for event related to the mobility measurement.

Figure 12B:
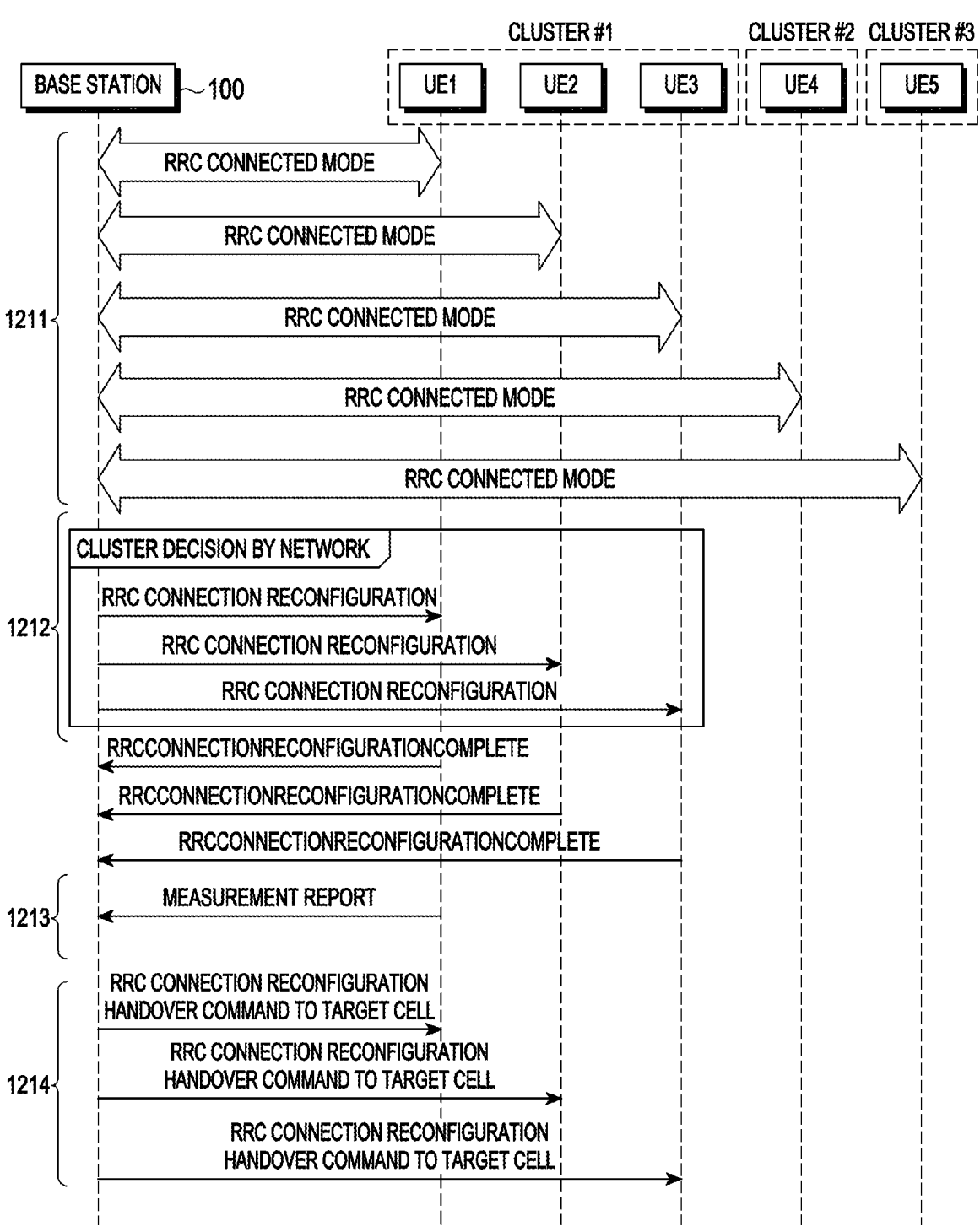
FIG. 12B illustrates signaling between the wireless network and the UEs for handover, according to an example embodiment.

FIG. 12B illustrates signaling between the wireless network and the UEs for the handover, according to an example embodiment. At 1211, consider the UEs (UE1, UE2, UE3, UE4, UE5) are in RRC connected mode. At 1212, the base station (100) forms the cluster (cluster #1, cluster #2, cluster #3) of UEs and performs cluster convergence. All the UEs become part of one or the other clusters. The characteristics of the UEs in one cluster will be almost similar. Further, the base station (100) determines threshold values using the regression model to take decision. Further, the base station (100) reconfigures the UEs in the cluster based on the regression model threshold values. At 1213, UE1 in the cluster #1 sends the measurement report for event A3/A5 related to the handover. Consider, the signal strength reported by the UE 1 is approaching the mobility threshold. At 1214, the base station (100) evaluates all the UEs in the cluster. Further, the base station (100) sends the handover command to all the UEs in the cluster. Due to a smaller number of signaling between the BS (100) and the UEs, the radio resources will be saved, which further reduces UE power consumption and chances of failures (handover or RLF) for the UEs belonging to the cluster.

Figure 13A:
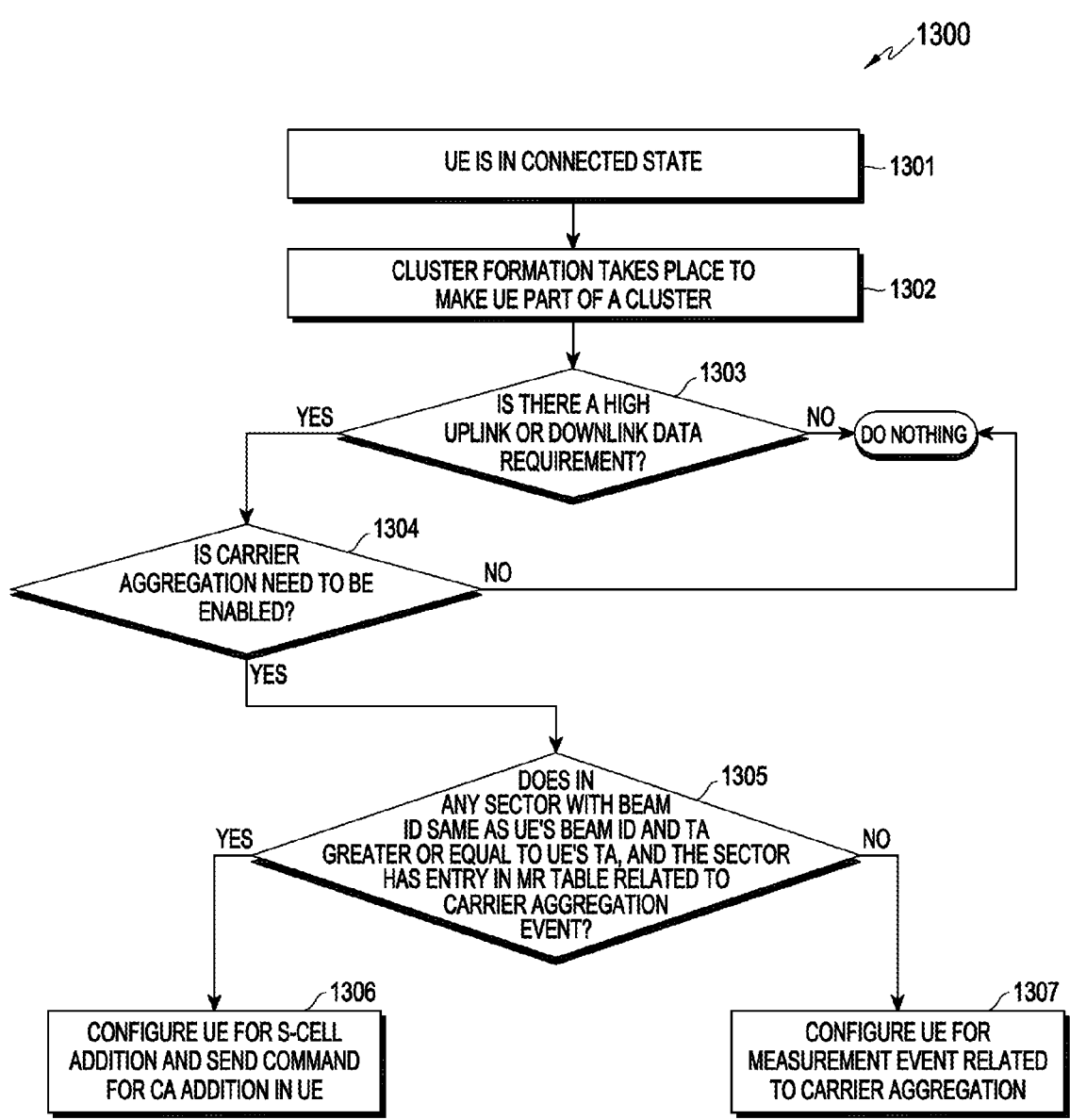
FIG. 13A is a flow diagram illustrating a method for taking the decision for a secondary cell addition for carrier aggregation, according to an example embodiment.

FIG. 13A is a flow diagram illustrating a method for taking the decision for a secondary cell addition for the carrier aggregation, according to an example embodiment. At 1301, the UE is in connected state. At 1302, the BS (100) forms the cluster of the UEs and performs the cluster convergence. All the UEs become part of one or the other clusters. The characteristics of the UEs in a cluster will be almost similar. At 1303-1304, the BS (100) determines the eligibility of the UEs for the carrier aggregation configuration based on the UE capability and the data session requirements. Based on the eligibility evaluation, the BS (100) configures the carrier aggregation in all the eligible UEs within the cluster. At 1305, the BS (100) checks whether in any sector with the beam ID same as the UE's beam ID, the TA greater or equal to the UE's TA, and the sector has entry in the MR table related to carrier aggregation event. At 1306, when the sector with the beam ID is as the UE's beam ID, the TA is greater or equal to the UE's TA, and the sector has entry in the MR table related to the carrier aggregation event, then the BS (100) sends the RRC reconfiguration with the carrier aggregation addition and the S-cell addition to the UE with higher data requirement in the cluster. At 1307, at least one of: when the sector with the beam ID is not as the UE's beam ID, the TA is not greater or equal to the UE's TA, and the sector has not entered in the MR table related to the carrier aggregation event, then the BS (100) configures the UE for measurement event related to the carrier aggregation.

Figure 13B:
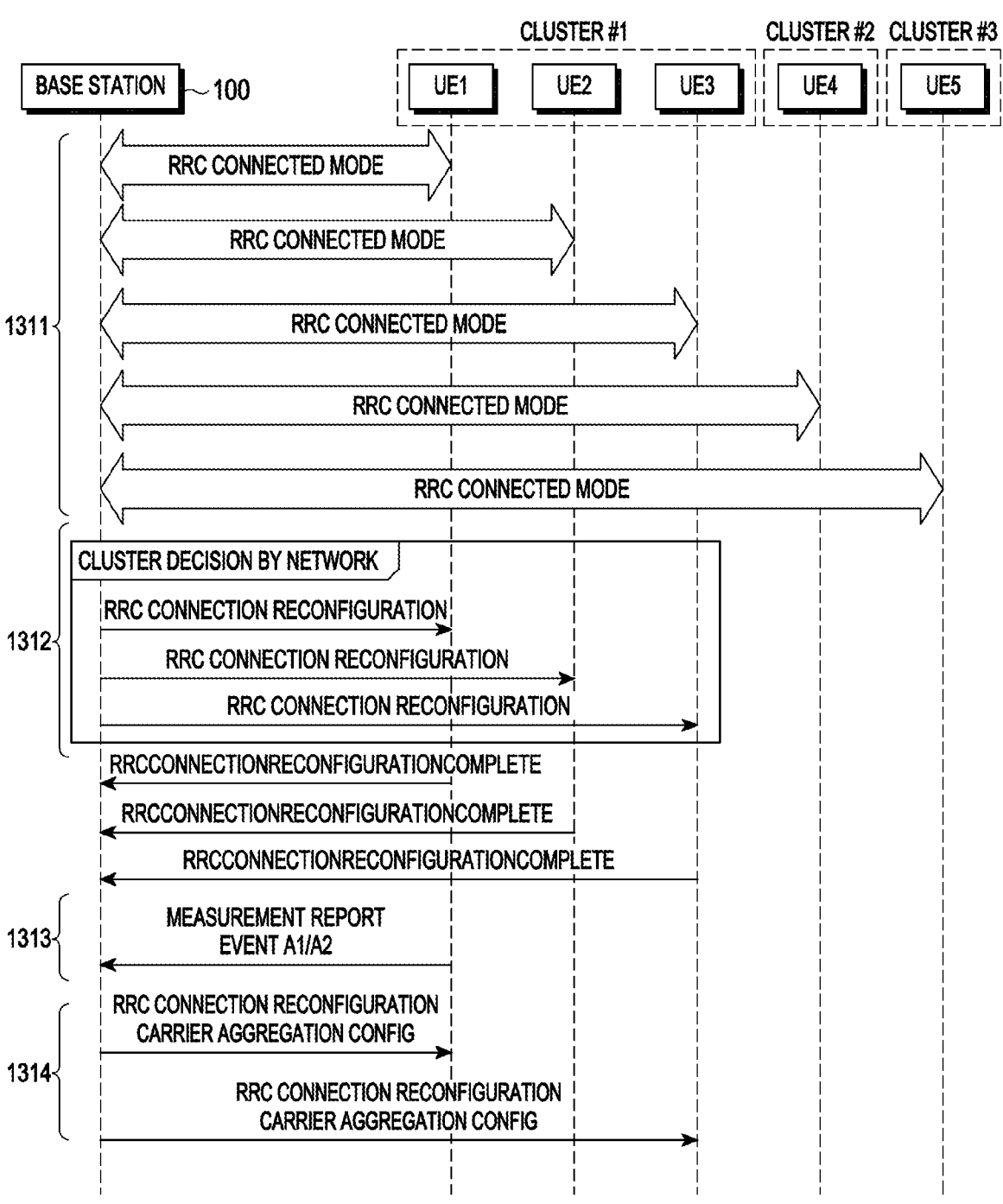
FIG. 13B illustrates signaling between the wireless network and the UEs for the secondary cell addition for the carrier aggregation, according to an example embodiment.

FIG. 13B illustrates signaling between the wireless network and the UEs for the secondary cell addition for the carrier aggregation, according to an example embodiment. At 1311, consider the UEs (UE1, UE2, UE3, UE4, UE5) are in RRC connected mode. At 1312, the base station (100) forms the cluster (cluster #1, cluster #2, cluster #3) of UEs and performs cluster convergence. All the UEs become part of one or the other clusters. The characteristics of the UEs in one cluster will be almost similar. Further, the base station (100) determines threshold values using the regression model to take decision. Further, the base station (100) reconfigures the UEs in the cluster based on the regression model threshold values. At 1313, the UE1 in the cluster #1 sends the measurement report for event A1/A2 related to the carrier aggregation. The base station (100) evaluates the support of the carrier aggregation and data requirements of the UEs in the cluster. At 1314, based on measurement report from one of the UEs from the cluster, the base station (100) configures the carrier aggregation to all the eligible UEs. No explicit measurement report from each UEs within a cluster is required for the CA configuration. Due to a smaller number of signaling between the BS (100) and the UEs, the radio resources will be saved, which further reduces the UE power consumption and reduce the delay in configuring CA to the UEs belonging to the cluster.

Figure 14A:
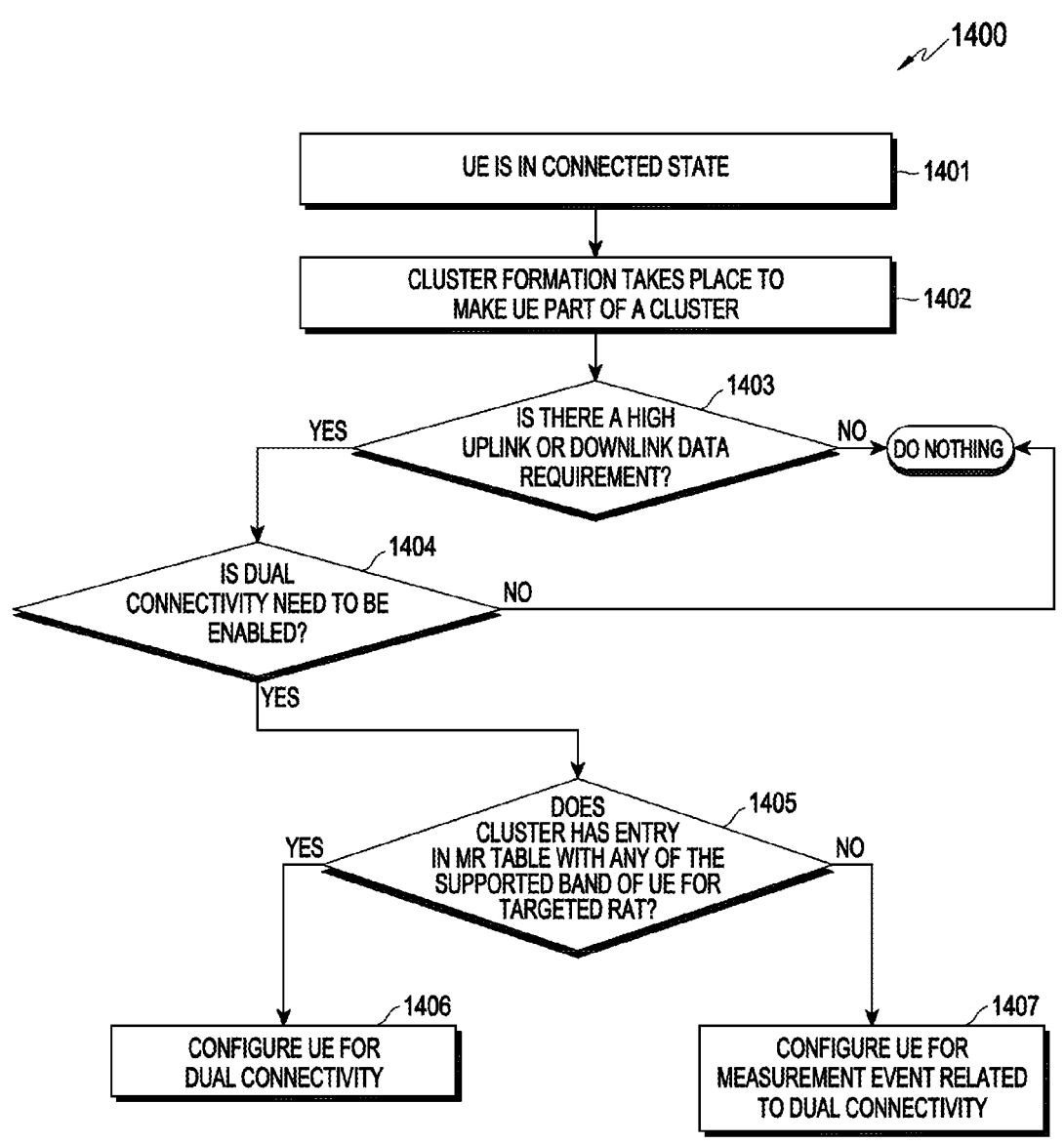
FIG. 14A is a flow diagram illustrating a method for taking the decision for a second RAT addition for dual connectivity, according to an example embodiment.

FIG. 14A is a flow diagram illustrating a method for taking the decision for the second RAT addition for the dual connectivity, according to an example embodiment. At 1401, the UE is in connected state. At 1402, the BS (100) forms the cluster of the UEs and performs the cluster convergence. All the UEs become part of one or the other clusters. The characteristics of the UEs in a cluster will be almost similar. At 1403-1404, the BS (100) determines the eligibility of the UEs for the dual connectivity configuration based on the UE capability and the data session requirements. Based on the eligibility evaluation, the BS (100) configures the dual connectivity in all the eligible UEs within the cluster. At 1405, the BS (100) checks whether the cluster has the entry in the MR table with any of the supported band of the UE for the targeted RAT (e.g. targeted cell). At 1406, when the cluster has the entry in the MR table, then the BS (100) sends the RRC reconfiguration with the dual connectivity addition to the UE with higher data requirement in the cluster. At 1407, when the cluster has not entered in the MR table, then the BS (100) configures the UE for measurement event related to the dual connectivity.

Figure 14B:
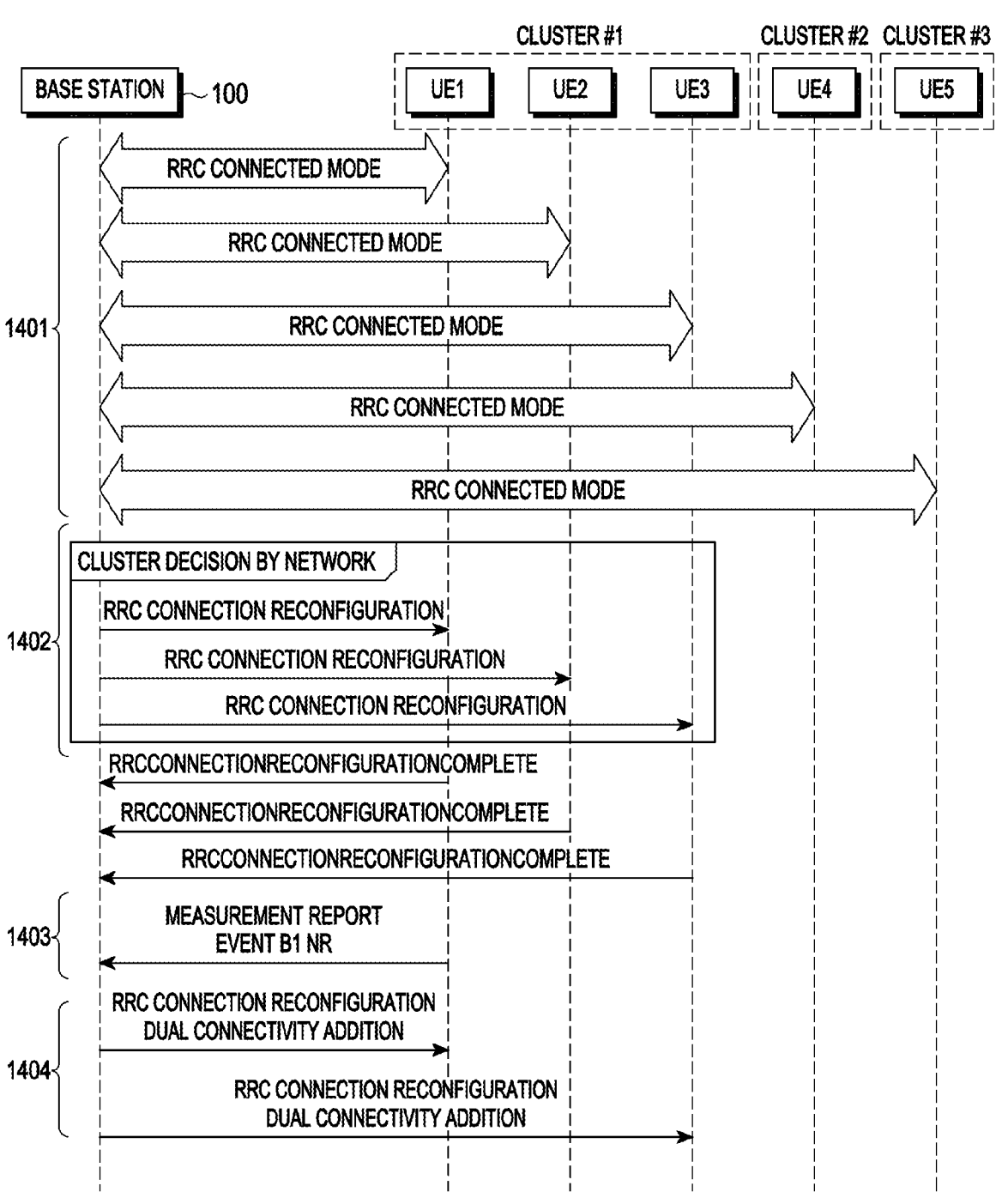
FIG. 14B illustrates signaling between the wireless network and the UEs for the second RAT addition for the dual connectivity, according to an example embodiment.

FIG. 14B illustrates signaling between the wireless network and the UEs for the second RAT addition for the dual connectivity, according to an example embodiment. At 1411, consider the UEs (UE1, UE2, UE3, UE4, UE5) are in RRC connected mode. At 1412, the base station (100) forms the cluster (cluster #1, cluster #2, cluster #3) of UEs and performs cluster convergence. All the UEs become part of one or the other clusters. The characteristics of the UEs in one cluster will be almost similar. Further, the base station (100) determines threshold values using the regression model to take decision. Further, the base station (100) reconfigures the UEs in the cluster based on the regression model threshold values. At 1413, the UE1 in the cluster #1 sends the measurement report for event B1 NR related to the DC. The base station (100) evaluates the support of the DC in the UEs in the cluster. At 1314, based on the measurement report from one of the UEs from the cluster, the base station (100) configures the DC to all the eligible UEs. No explicit measurement report from each UEs within a cluster is required for the DC configuration. Due to a smaller number of signaling between the BS (100) and the UEs, the radio resources will be saved, which further reduces the UE power consumption and reduce the delay in configuring DC to the UEs belonging to the cluster.

Each embodiment herein may be used in combination with any other embodiment(s) described herein.

Figure 15A:
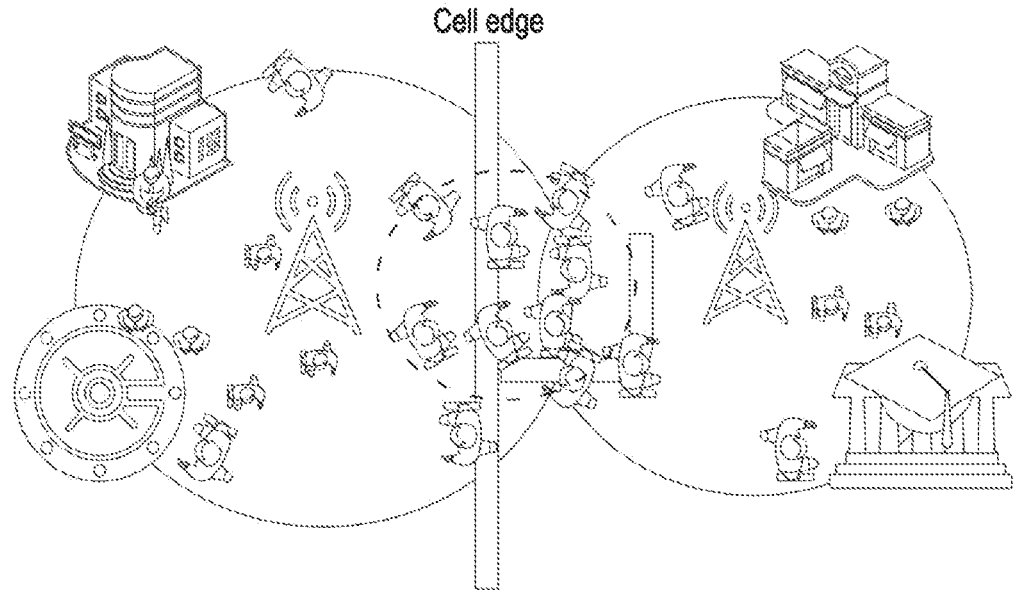
FIGS. 15A-15B illustrate a problem the existing system and advantages of the proposed system, according to an example embodiment.
Figure 15B:
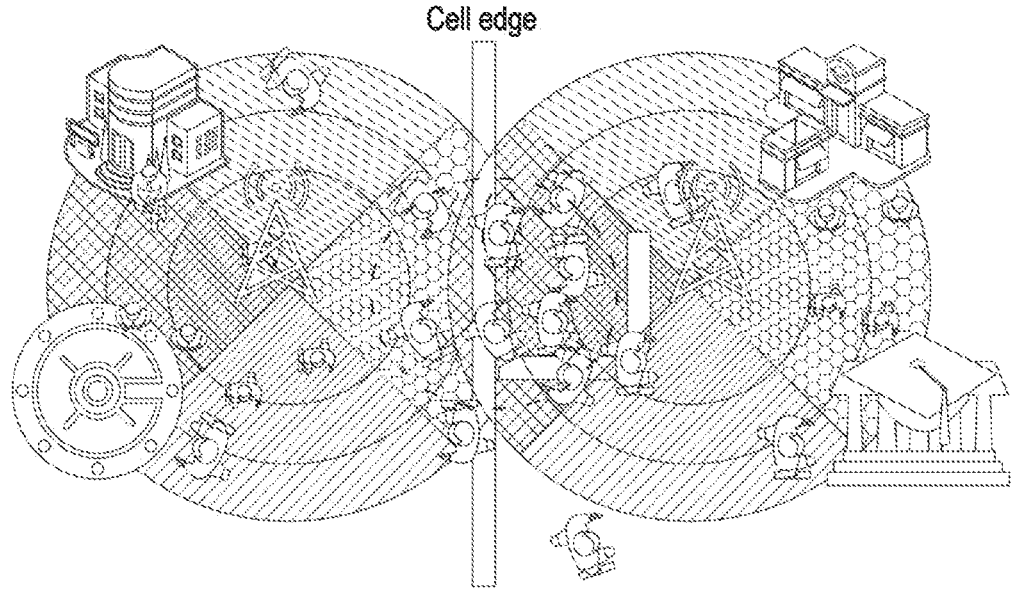

FIGS. 15A-15B illustrate a problem the existing system and advantages of the proposed system, according to an example embodiment. The problem in existing system is shown in the FIG. 15A. Large number of closely spaced UEs are performing the measurement and sending the measurement report containing the same target cell for handover. Each UE sends individual measurement report to the wireless network, but the wireless network can process only limited number of UEs under high signalling. Hence for other UEs, decision making may get delayed resulting in failure such as Radio Link Failure (RLF) and SCG-fail, which degrades the user experience as call may be dropped or data session can be discontinued.

In order to avoid high measurement report signalling, the BS (100) assigns each UE to the logical cluster defined using the beam ID and the TA. In one logical cluster only few percent of total UE present in the cluster are configured to do the measurement for the target cell. Based on the available measurement report, UE's mobility direction, and signal condition the BS (100) takes the decision. Based on previously received measurement report and the current UE location, the UE velocity, the UE capability and the signal condition, the BS (100) takes accurate decision for the UE, which reduces the overall RLFs and SCG-failure count in the cell. "Based on" as used herein covers based at least on.

As shown in the FIG. 16, for the UE circled in white network, decision of handover to a cell from another cell is made without doing explicit measurement by the UE.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred example embodiments, those skilled in the art will recognize that the embodiments herein can be practiced with modification within the scope of the embodiments as described herein.

What is claimed is:

1. A method for handling network functionalities of a wireless network, comprises:
  receiving, by a base station of the wireless network, parameters from a plurality of user equipments (UEs) in the wireless network;
  identifying, by the base station, a plurality of UE clusters within a cell of the base station based on the parameters including beam identifiers (IDs) and timing advances (TAs) of the plurality of UEs;
  detecting, by the base station, a network service requirement of a UE cluster among the plurality of UE clusters;
  determining, by the base station, whether the UE cluster among the plurality of UE clusters meets a threshold condition based on the parameters; and
  activating, by the base station, a network functionality for the UE cluster based on the network service requirement of the UE cluster in case that the UE cluster in the plurality of UE clusters meets the threshold condition.

2. The method as claimed in claim 1, wherein the parameters comprise at least one of a previous measurement report from each UE, strength of wireless signal receiving at each UE, capability information of each UE, a location of each UE, a velocity of each UE, a beam ID of each UE, and a TA of each UE, and
  wherein the capability information comprises at least one of a UE category, a number of antennas, Radio Access Technology (RAT) capability, band capability, Carrier Aggregation (CA) capability, and Dual Connectivity (DC) capability.

3. The method as claimed in claim 1, wherein the network service requirement comprises at least one of a data requirement, a Quality of Service (QoS) requirement, and a call service requirement.

4. The method as claimed in claim 1, wherein the network functionality comprises at least one of handover, secondary cell addition for a carrier aggregation, second Radio Access Technology (RAT) addition for dual connectivity, a RAT Fall Back (RATFB), and reconfiguration of UE measurements.

5. The method as claimed in claim 1, wherein identifying, by the base station, the plurality of UE clusters within the cell of the base station based on the parameters, comprises:
  creating, by the base station, the plurality of UE clusters within the cell of the base station based on a beam ID of each UE, and a TA of each UE in the parameters;
  determining, by the base station, at least one UE sector in each UE cluster based on the beam ID, and the TA;
  estimating, by the base station, a similarity between sectors of multiple UE clusters in the plurality of UE clusters using a similarity function; and
  merging, by the base station, the multiple UE clusters to a single UE cluster when the similarity between the sectors of the multiple UE clusters is less than a similarity threshold.

6. The method as claimed in claim 5, wherein the method comprises:
  removing, by the base station, a sector from the UE cluster when all UEs in the sector are removed.

7. The method as claimed in claim 5, wherein the method comprises:
  removing, by the base station, the UE cluster when all sectors in the UE cluster are removed.

8. The method as claimed in claim 1, wherein determining, by the base station, the threshold condition based on the parameters, comprises:
  determining, by Machine Learning (ML) model of the base station, whether the parameters belonging to each cluster are within a measurement control information comprising an offset, a hysteresis, and a threshold;
  estimating, by the base station, at least one of:
  a value of a cost function of the ML model is low when the parameters belonging to each cluster are within the measurement control information, and
  the value of the cost function of the ML model is high when the parameters belonging to each cluster are not within the measurement control information;
  determining, by the base station, a similarity threshold, a mobility threshold and a configuration mobility threshold based on the value of the cost function; and
  determining, by the base station, the threshold condition using at least one of the similarity threshold, the mobility threshold and the configuration mobility threshold.

9. The method as claimed in claim 1, wherein activating, by the base station, the network functionality for the UE cluster based on the network service requirement of the UE cluster upon determining that the UE cluster in the plurality of UE clusters meets the threshold condition, comprises:
  determining, by the base station, that one or more UEs in the UE cluster is moving;
  evaluating, by the BS, a signal strength, a mobility status and a direction of movement of each UE within the UE cluster with respect to an evaluation criteria; and
  reconfiguring, by the base station, all UEs in the UE cluster meeting the evaluation criteria with a target cell using a Measurement Report (MR) table and a UE velocity for handover.

10. The method as claimed in claim 1, wherein activating, by the base station, the network functionality for the UE cluster based on the network service requirement of the UE cluster upon determining that the UE cluster in the plurality of UE clusters meets the threshold condition, comprises:

evaluating, by the base station, each UE in the UE cluster having higher data transmission requirements and a carrier aggregation support with respect to an evaluation criteria;

determining, by the base station, whether information of a sector was entered into a Measurement Report (MR) table related to a carrier aggregation event, or whether information of sectors with a higher Timing Advance (TA) compared to other sectors that share a same beam ID was entered into the MR table related to the carrier aggregation event; and configuring, by the base station, all UEs in the UE cluster meeting the evaluation criteria for secondary cell addition for a carrier aggregation.

11. The method as claimed in claim 1, wherein activating, by the base station, the network functionality for the UE cluster based on the network service requirement of the UE cluster upon determining that the UE cluster in the plurality of UE clusters meets the threshold condition, comprises:

evaluating, by the base station, each UE in the UE cluster having higher data transmission requirements and a dual connectivity support with respect to an evaluation criteria;

determining, by the base station, whether the UE cluster with a supported band of each UE was entered in a MR table for connecting to a targeted Radio Access Technology (RAT); and configuring, by the base station, all UEs in the UE cluster meeting the evaluation criteria for secondary cell group addition for the dual connectivity.

12. A base station for handling network functionalities of a wireless network, comprises:

a communicator;

a memory storing instructions; and at least one processor configured to execute the stored instructions for:

receiving, through the communicator, parameters from a plurality of user equipments (UEs) in the wireless network, identifying a plurality of UE clusters within a cell of the base station based on the parameters including beam identifiers (IDs) and timing advances (TAs) of the plurality of UEs, detecting a network service requirement of a UE cluster in the plurality of UE clusters, determining whether the UE cluster in the plurality of UE clusters meets a threshold condition based on the parameters, and activating a network functionality for the UE cluster based on the network service requirement of the UE cluster in case that the UE cluster in the plurality of UE clusters meets the threshold condition.

13. The base station as claimed in claim 12, wherein the parameters comprise at least one of a previous measurement report from each UE, strength of wireless signal receiving at each UE, capability information of each UE, a location of each UE, a velocity of each UE, a beam ID of each UE, and a TA of each UE, wherein the capability information comprise at least one of a UE category, a number of antennas, Radio Access Technology (RAT) capability, band capability, Carrier Aggregation (CA) capability, and Dual Connectivity (DC) capability.

14. The base station as claimed in claim 12, wherein the network service requirement comprise at least one of a data requirement, a Quality of Service (QoS) requirement, and a call service requirement.

15. The base station as claimed in claim 12, wherein the network functionality comprise at least one of handover, a secondary cell addition for a carrier aggregation, a second Radio Access Technology (RAT) addition for dual connectivity, a RAT Fall Back (RATFB), and reconfiguration of UE measurements.

16. The base station as claimed in claim 12, wherein the at least one processor is further configured to execute the stored instructions for:

creating the plurality of UE clusters within the cell of the base station based on a beam ID of each UE, and a TA of each UE in the parameters;

determining at least one UE sector in each UE cluster based on the beam ID, and the TA;

estimating similarity between sectors of multiple UE clusters in the plurality of UE clusters using a similarity function; and merging the multiple UE clusters to a single cluster when the similarity between the sectors of the multiple UE clusters is less than a similarity threshold.

17. The base station as claimed in claim 16, wherein the at least one processor is further configured to execute the stored instructions for:

removing the sector from the cluster when all UEs in the sector are removed.

18. The base station as claimed in claim 16, wherein the at least one processor is further configured to execute the stored instructions for:

removing the cluster when all sectors in the cluster are removed.

19. The base station as claimed in claim 12, wherein the at least one processor is further configured to execute the stored instructions for:

determining, by Machine Learning (ML) model of the base station, whether the parameters belonging to each cluster are within a measurement control information comprising an offset, a hysteresis, and a threshold;

estimating one of:

a value of a cost function of the ML model is low when the parameters belonging to each cluster are within the measurement control information, and the value of the cost function of the ML model is high when the parameters belonging to each cluster are not within the measurement control information;

determining a similarity threshold, a mobility threshold and a configuration mobility threshold based on the value of the cost function; and determining the threshold condition using at least one of the similarity threshold, the mobility threshold and the configuration mobility threshold.

20. A non-transitory computer readable storage medium may include one or more programs, the one or more programs comprising instructions configured to, when executed by at least one processor of a base station, cause the base station for handling network functionalities of a wireless network to perform operations comprising:

receiving parameters from a plurality of user equipments (UEs) in the wireless network;

identifying a plurality of UE clusters within a cell of the base station based on the parameters including beam identifiers (IDs) and timing advances (TAs) of the plurality of UEs;

detecting a network service requirement of a UE cluster among the plurality of UE clusters, to determine whether the UE cluster among the plurality of UE clusters meets a threshold condition based on the parameters; and activating a network functionality for the UE cluster based on the network service requirement of the UE cluster in case that the UE cluster in the plurality of UE clusters meets the threshold condition.

\* \* \* \* \*